(12) United States Patent
Ishihara

(10) Patent No.: US 6,687,303 B1
(45) Date of Patent: Feb. 3, 2004

(54) MOTION VECTOR DETECTING DEVICE

(75) Inventor: Kazuya Ishihara, Hyogo (JP)

(73) Assignee: Renesas Technology Corp., Tokyo (JP)

( * ) Notice: Subject to any disclaimer, the term of this patent is extended or adjusted under 35 U.S.C. 154(b) by 0 days.

(21) Appl. No.: 09/420,572

(22) Filed: Oct. 19, 1999

(30) Foreign Application Priority Data

Mar. 17, 1999 (JP) .......................................... 11-071334

(51) Int. Cl.$^7$ ................................................ H04N 7/12
(52) U.S. Cl. ................................................ 375/240.21
(58) Field of Search ...................... 375/240.17, 240.21, 375/240.24, 240.16

(56) References Cited

U.S. PATENT DOCUMENTS

| | | | | |
|---|---|---|---|---|
| 5,400,087 A | * | 3/1995 | Uramoto et al. ............. | 348/699 |
| 5,987,178 A | * | 11/1999 | Anesko et al. ............... | 382/236 |
| 6,317,136 B1 | * | 11/2001 | Choi ........................... | 345/537 |
| 2002/0009144 A1 | * | 1/2002 | Ishihara et al. ......... | 375/240.16 |

FOREIGN PATENT DOCUMENTS

JP 7-250328 9/1995

OTHER PUBLICATIONS

"A Half–pel Precision MPEG2 Motion–Estimation Processor with Concurrent Three–Vector Search", K. Ishihara et al., IEEE Journal of Solid State Circuits, vol. 30, No. 12, Dec. 1995, pp. 1502–1509.

* cited by examiner

*Primary Examiner*—Chris Kelley
*Assistant Examiner*—George A Bugg
(74) *Attorney, Agent, or Firm*—McDermott, Will & Emery

(57) ABSTRACT

Data transfer paths between shift registers arranged corresponding to element processors and delay buffers arranged corresponding to shift register columns are changed in accordance with sub-sampling rate information. The delay buffer and the shift register column transfer the search window block pixel data. The element processor stores the template block pixel data. Motion vectors can be detected fast with high accuracy without increase of a volume of hardware.

12 Claims, 28 Drawing Sheets

4:1 SUB-SAMPLING MODE

2:1 SUB-SAMPLING MODE

4:1 SUB-SAMPLING MODE

2:1 SUB-SAMPLING MODE

4:1 SUB-SAMPLING MODE

2:1 SUB-SAMPLING MODE

MOTION VECTOR DETECTING DEVICE

CROSS REFERENCE

A copending application of U.S. Ser. No. 09/084,504 filed May 27, 1998 is related to the present application, and is cited as a cross-reference.

BACKGROUND OF THE INVENTION

1. Field of the Invention

The present invention relates to a device for detecting a motion vector used for motion compensating of motion pictures, and particularly relates to a motion vector detecting device for detecting motion vectors in accordance with a block matching method.

2. Description of the Background Art

For transmitting and storing image signals having a huge volume of data, a data compressing technique is indispensable for reducing the volume of data. Image data includes considerable redundancy caused, e.g., by a correlation between neighboring pixels and visual properties of humans. The data compression technique for suppressing the redundancy of image data to reduce the volume of data to be transmitted is called as a high efficiency coding. An inter-frame (inter-field) predictive coding method is one of such high efficiency coding methods. The following processing is executed in this inter-frame (inter-field) predictive coding method.

Calculation is performed for each pixel to obtain a prediction error, which is a difference between pixel data in a current frame (or field) to be coded and pixel data at the same position in a reference frame (or field) preceding or succeeding in time the current frame. The prediction error calculated is used in the coding process to be performed thereafter. According to this method, if the images contain less motion a prediction error value is small, and the coding can be performed efficiently, because a high correlation is present between the frames (fields). If the images contain large motion, however, the correlation between frames (fields) is small so that a large error occurs, resulting in increase in volume of data to be transmitted. An inter-frame (or inter-field) predictive coding method with motion compensation is proposed as a method for overcoming the above problem.

FIG. 50 schematically shows a structure of a predictive coding circuit in the prior art. In FIG. 50, the predictive coding circuit includes a motion compensation predictor 920 which detects a motion vector for image signals applied from a preprocessing circuit at an upstream stage to produce a motion-compensated reference image in accordance with the motion vector detected, a loop filter 922 which filters reference image pixel data read from motion compensation predictor 920, a subtractor 924 which obtains a difference between the input image signal and the output signal of loop filter 922, an orthogonal transformer 926 which performs an orthogonal transformation on the output signal (data) of subtractor 924, and a quantizer 928 which quantizes the output data of orthogonal transformer 926.

Motion compensation predictor 920 has a frame memory for storing image data of a preceding frame (or field), and produces the motion-compensated reference image pixel data in accordance with the image data of the preceding frame and input image signal data. The reference image pixel data motion-compensated and produced is stored in another buffer memory in motion compensation predictor 920. Loop filter 922 is provided for improving an image quantity.

Orthogonal transformer 926 performs an orthogonal transformation such as DCT transformation on the data received from subtractor 924 in a unit of a block of a predetermined size (usually 8×8 pixels). Quantizer 920 quantizes the transformed pixel data.

Motion compensation predictor 920 and subtractor 924 perform the inter-frame prediction (or inter-field prediction) for motion compensation, and reduce the temporal redundancy of the motion image. The spacial redundancy in the motion image is reduced by the orthogonal transformation by orthogonal transformer 926.

The coding circuit further includes an inverse quantizer 930 for transforming the data quantized by quantizer 928 into the original signal state, an inverse orthogonal transformer 932 for performing inverse orthogonal transformation on the output data of inverse quantizer 930, and an adder 934 for adding the output data of loop filter 922 to the output data of inverse orthogonal transformer 932. The inverse quantizer 930 and the inverse orthogonal transformer 932 produce the image data to be used in the inter-frame (inter-field) prediction for a succeeding frame (or field). Thus, inverse orthogonal transformer produces a difference value code to be transmitted. Adder 934 adds the output data of loop filter 922 to the inter-frame (inter-field) difference data received from inverse orthogonal transformer 932, whereby the image data of the current frame (field) is reproduced. The output data of adder 934 is written into the frame buffer included in motion compensation predictor 920. Description will now be given on the manner of detecting a motion vector mv in motion compensation predictor 920.

It is now assumed that a picture 950 is formed of 352 dots (pixels)×288 rows as shown in FIG. 51. Picture 950 is divided into a plurality of blocks each including 16×16 pixels. The motion vectors are detected on a block-by-block basis. It is assumed that a search area representing an area, in which a motion vector is searched, is formed of an image block 956. This image block (search area) 956 is larger by 16 pixels than a block 955 in each of the horizontally opposite directions and vertically opposite directions on the screen. Block 954 is located in the same position as a target block (template block) 952. Template block 952 is the current image block. The motion vector is detected with respect to this template block 952. Searching of the motion vector is performed in the following manner.

In FIG. 51, a block indicated by a vector (i, j) has a displacement (i, j) with respect to template block 952. This vector (i, j) is a motion vector candidate. An estimation function value is obtained. This estimation function value is, for example, an absolute difference value sum (or squared difference sum) of each pixel data in template block 952 and each respective pixel (in the same position) in the block having the displacement vector (i, j). The operation of obtaining the estimation function values is executed on every displacement in a range of vectors (i, j) from (−16, −16) to (+16, +16). The estimation function values are obtained for all the blocks (prediction image blocks) of the image blocks (search window blocks) in search area 956, and the prediction image block having the minimum estimation function value is detected. The displacement relative to block 954 of the prediction image block having the minimum estimation function value is determined as the motion vector with respect to template block 952.

This detection of the motion vector is performed before calculating the prediction error. The prediction image is the frame (or field) preceding or succeeding in time the current frame (or field). In accordance with the calculated motion vector, the prediction image of the frame (or field) to be referred to is moved. The image data in the position shifted by the motion vector of the frame (or field) to be referred to is used as the reference image, and each pixel in this reference image is used as the predictive value. Calculation is performed to obtain each prediction error between the pixels in the same position of the reference frame (or field) after the movement and the current frame (or field), and the calculated prediction errors are transmitted together with the motion vector.

The current picture and the reference picture are divided into blocks, and the reference image block having the highest correlation with the reference image block is obtained. This method is referred to as the block matching method. According to this block matching method, the reference image block having the highest correlation in a unit of a pixel block can be detected so that the prediction error can be small, and coding with high efficiency can be achieved. This motion vector must be transmitted every pixel block. If the block size is small, the number of blocks is large so that the volume of information to be transmitted becomes large. If the block size is large, the motion detection cannot be performed effectively. Accordingly, the pixel block generally has a size of 16×16 pixels as described above.

If the search area for the motion vector is wide, the reference pixel block having a higher correlation can be detected so that the motion vector can be detected with higher accuracy. If the search area is widened, however, the motion vector candidates increase in number so that the time required for detecting the motion vector increases. In the case where one pixel block is formed of 16×16 pixels as already described, the absolute difference values of 256 pixels must be obtained, and then the sum of these values must be obtained. By the operation of obtaining the sum, the estimation value for one motion vector candidate is obtained. This estimation value is obtained for each block in the search area, and the reference image block providing the minimum value is obtained. Therefore, this method suffers from such a problem that fast detection of the motion vectors and therefore fast coding of the image data are impossible if the search area is widened for obtaining an optimum motion vector.

SUMMARY OF THE INVENTION

An object of the invention is to provide a motion vector detecting device which can rapidly detect motion vectors with high accuracy.

Another object of the invention is to provide a motion vector detecting device which can cope with search areas of different sizes without difficulty.

Still another object of the invention is to provide a motion vector detecting device, which can easily perform sub-sampling of input pixel data at different sub-sampling rates, to rapidly detect motion vectors.

A motion vector detecting device according to the invention includes an image data input circuit for receiving template block pixel data and search area pixel data, and performing sub-sampling on the received pixel data to produce an output, an operation circuit for receiving the template block pixel data and the search area pixel data from the pixel data input circuit, and calculating an estimation value representing a candidate of the motion vector according to a block matching method with respect to the template block, and a motion vector determining circuit for receiving the estimation value from the operation circuit, and determining the motion vector with respect to the template block in accordance with the received estimation values.

The operation circuit includes a shift register circuit including shift registers for transferring the pixel data in one direction, and performing transference and storage of the search area pixel data applied from the image data input circuit, and a plurality of element processors provided corresponding to the shift registers. Each of the element processors includes a data register circuit for storing template block pixel data applied from the image data input circuit, and a calculating circuit for receiving the storage data in the data register circuit and the storage data in the corresponding shift register, and performing predetermined arithmetic operation on the received storage data to produce and output a component of the estimation value. The data register circuits in the plurality of element processors store data of different pixels in same template block.

The motion vector detecting device according to the invention further includes a path setting circuit for changing a data transfer path of the shift register circuit in accordance with the sub-sampling rate information.

By changing the data transfer path of the shift register circuit in accordance with the sub-sampling rate, the sub-sampled search area pixel data can be stored in the shift registers corresponding to the element processors. In the element processor, sub-sampled template block pixel data is stored. At this time, the operation circuit stores the pixel data of the template blocks corresponding in number to the sub-sampling rate. Calculation of the estimation values for the template blocks corresponding in number the sub-sampling rate can be performed in parallel within the operation circuit, and the motion vector can be detected without increasing the operation processing time even if the search area is widened. Change of the data transfer path of the shift registers is merely performed, and a plurality of sub-sampling rates can be employed while suppressing increase in hardware volume. Since it is possible to employ a plurality of sub-sampling rates, optimum search areas for specific applications can be determined.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
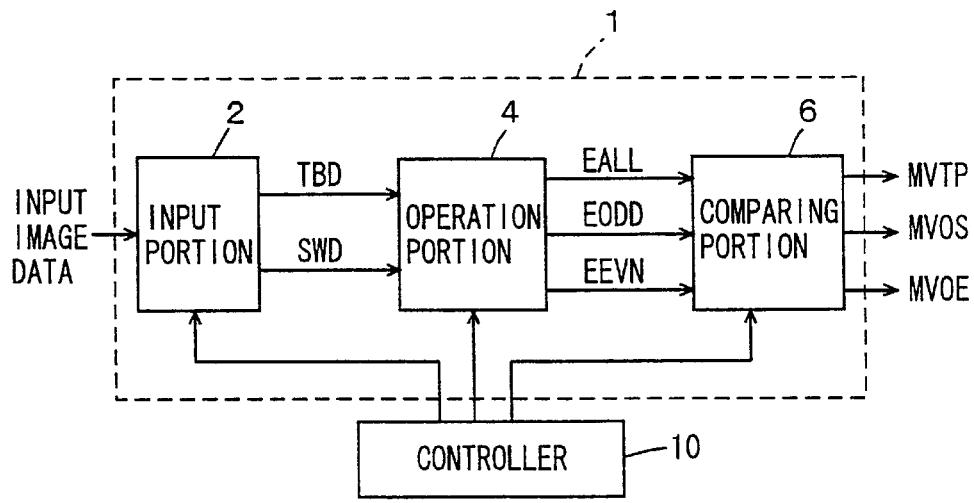
FIG. 1 schematically shows a whole structure of a motion vector detecting device according to a first embodiment of the invention.

FIG. 1 schematically shows a whole structure of a motion vector detecting device according to a first embodiment of the invention. In FIG. 1, a motion vector detecting device 1 includes an input section 2 receiving input image data, to perform sub-sampling at a predetermined sub-sampling rate for to perform template block data TBD and search window pixel data SWD, an operation section 4 receiving template block pixel data TBD and search window pixel data SWD from input portion 2, to perform predetermined arithmetic operation to produce estimation values EALL, EODD and EEVN, and a comparing portion 6 receiving estimation values EALL, EODD and EEVN in parallel from operation section 4, to produce motion vectors MVTP, MVOS and MVOE in accordance with the received estimation values.

Motion vector detecting device 1 shown in FIG. 1 codes pixel data on a flame by frame basis. Operation section 4 includes an element processor array, of which specific structure will be described later, and produces, in parallel, estimation values EALL for a frame-based template blocks estimation values EODD for a template block in an odd field, and estimation values EEVN for a template block in an even field. Comparing section 6 receives these estimation values EALL, EODD and EEVN, and produces a motion vector MVTP for a template block, a motion vector MVOS for an odd sub-template block and a motion vector MVOE for an even sub-template block. The sub-template block represents a template block on a field basis included in a template block on a frame basis.

Input section 2 may receive in parallel the search window pixel data and the template block pixel data on different ports, respectively, or may receive these data on the same port in a time division multiplex manner. The template block pixel data is applied, for example, in such a manner that image data supplied from a TV camera is stored in a memory, and then is supplied from this memory in a predetermined sequence. The search area pixel data is produced from prediction image data stored in a frame buffer (not shown).

The operation of motion vector detecting device 1 is controlled by a controller 10. Controller 10 may be formed on the same chip as motion vector detecting device 1. Alternatively, it may be formed on another chip to be included in another image data coding controller. Motion vector detecting device 1 shown in FIG. 1 performs the arithmetic operation in a pipeline manner in accordance with a clock signal (not shown). In operation section 4, the internal structure (i.e., transfer path of search window pixel data) is changed in accordance with the sub-sampling rate under the control of controller 10, and the estimation value is calculated based on sub-sampled pixel data.

Figure 2:
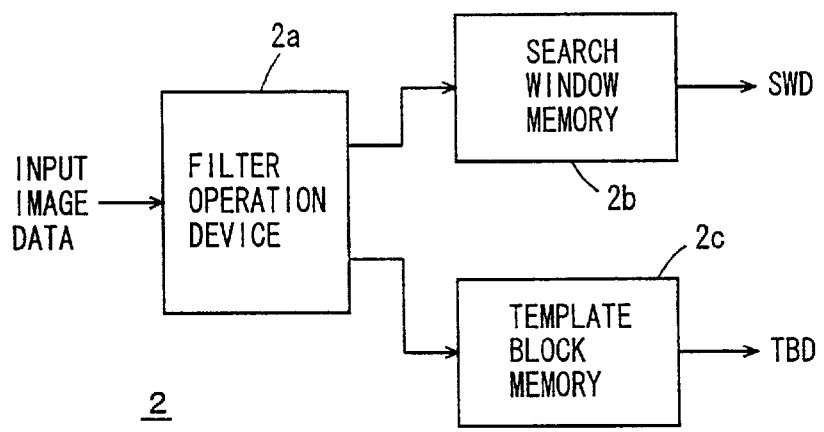
FIG. 2 schematically shows a structure of an input section shown in FIG. 1.

FIG. 2 schematically shows a structure of input section 2 shown in FIG. 1. In FIG. 2, input section 2 includes a filter operation unit 2a for performing predetermined filtering on received image data for outputting, a search window memory 2b for successively storing search window pixel data supplied from filer operation unit 2a, and a template block memory 2c for storing the template block pixel data supplied from filter operation unit 2a. Search window pixel data SWD is read out from search window memory 2b in a predetermined sequence, and template block pixel data TBD is read out from template block memory 2c.

The filter operation unit 2a sub-samples the pixel data included in the image data applied at a predetermined sub-sampling rate, to reduce he number of pixels to be processed. The structure of filter operation unit 2a will be described in greater detail. It is depicted that filter operation unit 2a is supplied with the search window pixel data and template block pixel data through the same port. This is because, in operation section 4, the template block pixel data are resident in the internal element processors, search window pixel data is read from search window memory 2b at a rate of one pixel data per estimation value calculating cycle, and these template block pixel data and search window pixel data are applied to filter operation unit 2a in a time division multiplex manner. Filter operation unit 2a may be adapted to be supplied with search window pixel data and template block pixel data through different ports, respectively.

Figure 3:
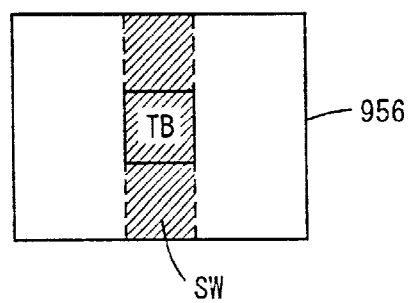
FIG. 3 shows a relationship between a search area and a template block.

FIG. 3 shows a positional relationship between template block TB and the search window. A search area 956 includes pixels which are present in a range of predetermined horizontal and vertical vector components with respect to template block TB. Search window SW includes blocks having the same horizontal vector component in search area 956. The horizontal width of search window SW is equal to a horizontal width (the number of pixels) of template block TB. Calculation of the estimation value is performed between a search window block included in search window SW and template block TB.

Figure 4:
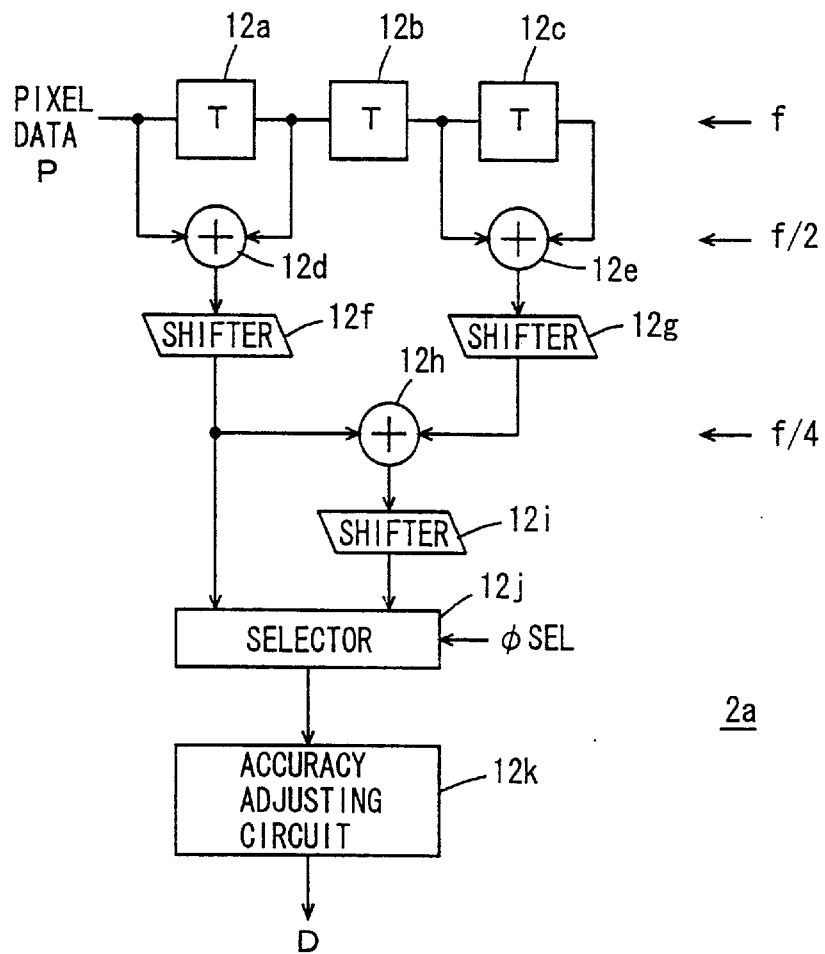
FIG. 4 shows a structure of a filter operation unit shown in FIG. 2.

FIG. 4 shows the structure of filter operation unit 2a shown in FIG. 2. In FIG. 4, filter operation unit 2a includes cascaded delay circuits 12a, 12b and 12c each delaying received pixel data by one clock cycle period, an adder 12d which adds the input pixel data to the output pixel data of delay circuit 12a, an adder 12e which adds the output pixel data of delay circuits 12b and 12c, a shifter 12f which shifts the output data of adder 12d by one bit toward a lower bit position, a shifter 12g which shifts the output data of adder 12e by one bit toward a lower bit position, an adder 12h which adds the output data of shifters 12f and 12g, a shifter 12i which shifts the output data of adder 12h by one bit toward a lower bit position, a selector 12j which selects one of the output data of shifters 12f and 12i in accordance with a select signal φSEL, and an accuracy adjusting circuit 12k which adjusts a bit width of data inputted from selector 12j, to reduce the accuracy of the sub-sampled pixel data to a slight extent. Output data D of accuracy adjusting circuit 12k is applied to and stored in search window memory 2b or template block memory 2c shown in FIG. 2.

Shifters 12f and 12g are activated at double the cycle of frequency f of the transfer clock signal of the pixel data (i.e., at a frequency of f/2), to perform shifting operation. Shifter 12i is activated at a cycle four times larger than that of the transfer clock signal (i.e., at a frequency of f/4), to shift the output data of adder 12h. Shifters 12f, 12g and 12i performing the one-bit shift operation operate as dividers performing frequency division by a factor of 2. Filter operation unit 2a shown in FIG. 4 operates in accordance with the sub-sampling rate of 4:1 or 2:1. Selector 12a selects one of the output data of shifters 12f and 12i in accordance with sub-sampling rate instructing signal φSEL.

The accuracy adjusting circuit 12k converts the pixel data of, e.g., 8 bits applied from selector 12j into data of, e.g., 7 bits. Accuracy adjusting circuit 12k may be a circuit for rounding down or up the lowest bit, or may be a circuit for performing the rounding based on comparison with a predetermined value. Accuracy adjusting circuit 12k is merely required to have a function of lowering the accuracy degree (number of bits) of the sub-sampled pixel data. By adjusting the data bit width by accuracy adjusting circuit 12k, pixel data bits stored in search window memory 2b and template block memory 2c are reduced in number, and increase in storage capacity of memories 2b and 2c is suppressed. Description will now be given on the operation of filter operation unit 2a shown in FIG. 4.

Figure 5:
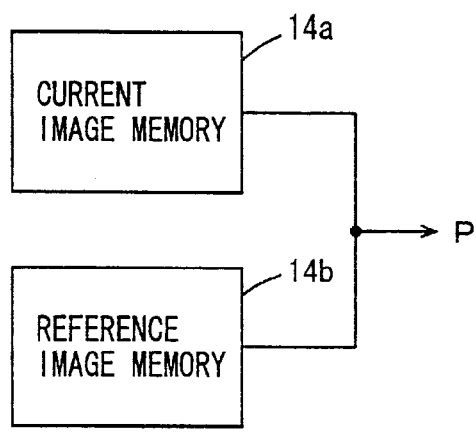
FIG. 5 schematically shows a structure of an input image data producing section.

Pixel data P is applied from a current image memory 14a and a reference image memory 14b as shown in FIG. 5. The current image memory 14a stores pixel data of the current image to be coded, and reference image memory 14b stores pixel data of the reference image preceding or succeeding in time the current image. Current image memory 14a and reference image memory 14b are arranged outside motion vector detecting device 1, and have writing and reading of pixel data performed under the control of controller 10.

Figure 6A:
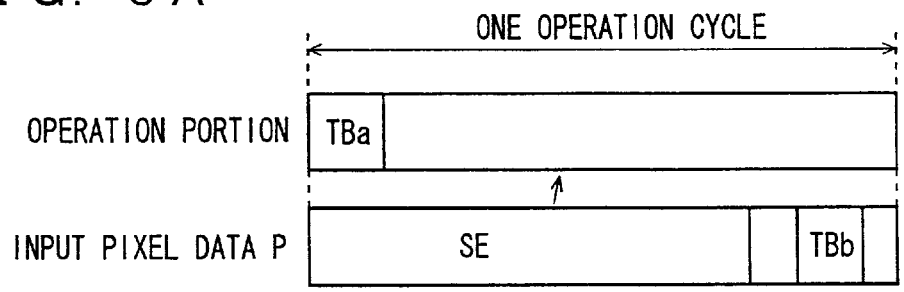
FIGS. 6A and 6B show, input image data transfer sequences, respectively.
Figure 6B:
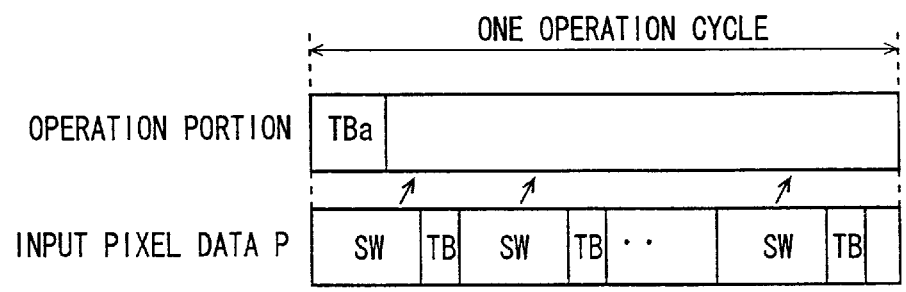

FIGS. 6A and 6B schematically show input sequences of input pixel data P. As shown in FIGS. 6A and 6B, the pixel data in template block TBa is resident in the operation section for one operation cycle. The one operation cycle represents a cycle in which a motion vector for template block TBa is detected. In this one operation cycle, it is not necessary to transfer template block pixel data TBD from template block memory 2c shown in FIG. 2 to operation section 2. Search window pixel data SWD of one pixel is read and applied from search window memory 2b to the operation section upon each calculation of the estimation value. The structure for this will be described later in detail.

Pixel data of a search window in the search area is input and stored in search window memory 2b alternately with reading of data from search window memory 2b. When all the pixel data in search area SE is input and stored in search window block memory 2b, pixel data of template block TBb to be processed subsequently is input. Accordingly, pixel data of search area SE and the pixel data of template block TB are applied in the time division multiplex manner if the pixel data is applied to filter operation unit 2a via one port.

Alternatively, as shown in FIG. 6B, the pixel data may be input in a unit of a search window SW, and input of pixel data of search window SW may be performed alternately with input of pixel data of template block TB to be processed subsequently. In this case, pixel data of search window SW and pixel data of template block TB to be processed subsequently are applied in a time division multiplex manner. Therefore, a common pixel data input port can be used for inputting both the template block pixel data and the search area pixel data to the input section. Any of the data input sequences shown in FIGS. 6A and 6B can be used. An appropriate sequence dan be determined in accordance with the storage capacity of the search window memory. In accordance with the input sequence, sub-sampled pixel data is supplied to search window memory 2b and template block memory 2c in input section 2.

Figure 7A:
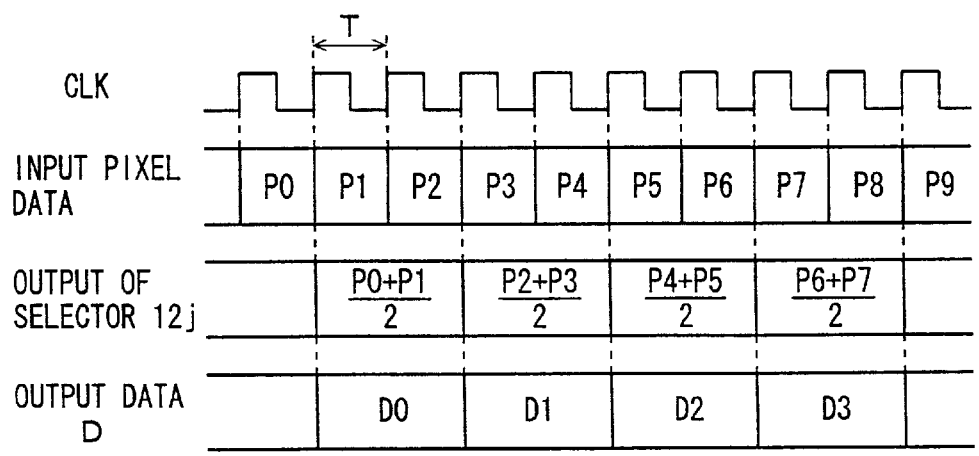
FIG. 7A is a timing chart representing operation of the filter operation unit shown in FIG. 4.

Description will now be given on the operation performed when 2:1 sub-sampling is performed input section 2, as shown in FIG. 7A. In the case of the sub-sampling rate of 2:1, selector 12j shown in FIG. 4 selects the output data of shifter 12f in accordance with select signal φSEL. In this operation, delay circuits 12b and 12c, adder 12e, shifters 12g and 12i, and adder 12h are disabled. This disabled state can be easily achieved merely by cutting off the power supply voltage.

As shown in FIG. 7A, it is now assumed that input pixel data P0, P1, P2, . . . are input in synchronization with a clock signal CLK. Delay circuit 12a delays the input pixel data by one period T of clock signal CLK, for outputting. Adders 12d and 12f operate at the frequency of f/2 equal to ½ of the frequency of clock signal CLK. Accordingly, when pixel data P1 is supplied from delay circuit 12a, shifter 12f generates the pixel data of (P+P1)/2, and holds this pixel data for a period of two clock cycles. This holding for two clock cycles can be easily achieved, for example, by provision of a latch circuit operating at a frequency of f/2 at the output of shifter 12f. Alternatively, a latch circuit operating at the frequency of f/2 may be provided at the input of adder 12d. Pixel data (P0+P1)/2 selected by selector 12j is applied to accuracy adjusting circuit 12k, in which lowering of the accuracy degree (adjustment of bit width) is performed, and data D0 is produced. Thereafter, the pixel data of shifter 12f changes every two clock cycles. Accordingly, data D0, D1, D2 and D3 are produced at a cycle of 2T.

Figure 7B:
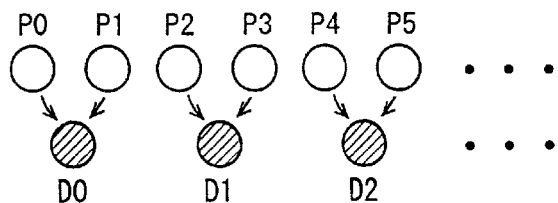
FIG. 7B shows a correspondence between input pixel data and output pixel data.

As shown in FIG. 7B, input pixel data P0, P1, . . . are sub-sampled to provide one pixel data from each unit including two pixel data. More specifically, sub-sampled pixel data D0 is produced from pixel data P0 and P1, and sub-sampled pixel data D1 is produced from pixel data P2 and P3. Also, sub-sampled pixel data D2 is produced from pixel data P4 and P5. Pixel data D0, D1, D2, . . . thus sub-sampled are used for calculating the estimation values as described below. When the template block has a size of 16×16 pixels, the template block has a size of 16 rows by 8 columns if the sub-sampling is performed at 2:1 rate in the horizontal direction. In the case where the operation section includes element processors corresponding to the template block size, data of two template blocks can be stored by utilizing the sub-sampled pixel data. Calculation of the estimation value can be simultaneously performed on the two template blocks. Accordingly, even in such a case that the search area is enlarged double in the horizontal direction, the operation time does not increase, and fast detection of a motion vector is achieved because the calculation of the estimation values is simultaneously performed on two template blocks, and the estimation points are reduced in number.

Figure 8A:
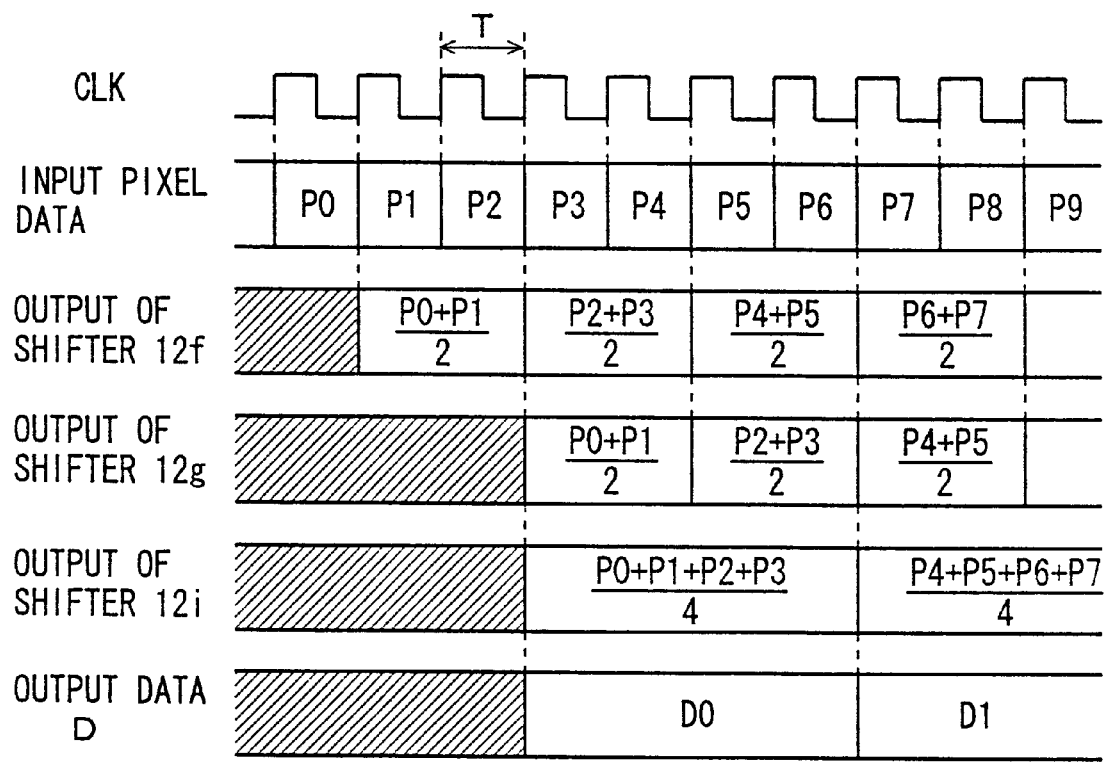
FIG. 8A is a timing chart representing an operation in a 4-to-1 sampling mode of the filter operation unit shown in FIG. 4.

In the case of 4-to-1 sub-sampling, selector 12j shown in FIG. 4 selects the output data of shifter 12i. In the case of sub-sampling rate of 4:1, all the components of the filter operation section shown in FIG. 4 operate. As shown in FIG. 8A, pixel data P0, P1, . . . are supplied in synchronization with clock signal CLK. The output data of shifter 12f is made definite at every two clock cycles. Thereby, shifter 12f generates an average value of the data of two adjacent pixels at every two clock cycles. Shifter 12g receives from adder 12e sums of the input and output pixel data of delay circuit 12c. Therefore, shifter 12g generates the pixel data formed by delaying the output data of shifter 12f by 2 clock cycles. The output data of shifters 12f and 12g are added by adder 12h. The data produced by adder 12h is applied to shifter 12i. Adder 12h and shifter 12i operate at a frequency of f/4. Therefore, the output data of shifter 12i changes at every four clock cycles. Shifter 12i shifts the output data of adder 12h downward by one bit, and carries out the division by a factor of 2. Accordingly, shifter 12i generates an average value of four adjacent pixels. The output data of shifter 12i is applied to accuracy adjusting circuit 12k via selector 12j. Therefore, data D0 and D1 subjected to the accuracy adjustment are successively generated at every four clock cycles.

Figure 8B:
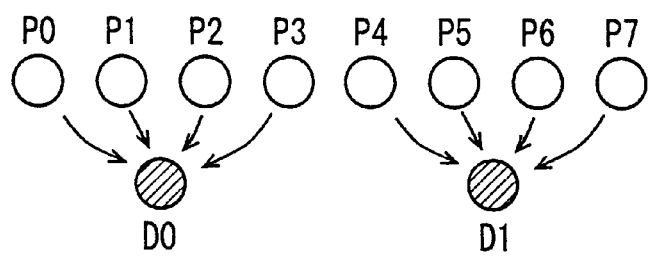
FIG. 8B shows a correspondence between the input and output pixel data.

More specifically, as shown in FIG. 8B, sub-sampled pixel data D0 is produced from four adjacent pixel data P0–P3, and next sub-sampled pixel data D1 is produced from next four adjacent pixel data P4–P7. One pixel data is produced from four pixel data, and the sub-sampling at 4:1 rate is executed, to reduce the number of pixels of a template block to a quarter thereof.

Modification of Filter Operation Unit

Figure 9A:
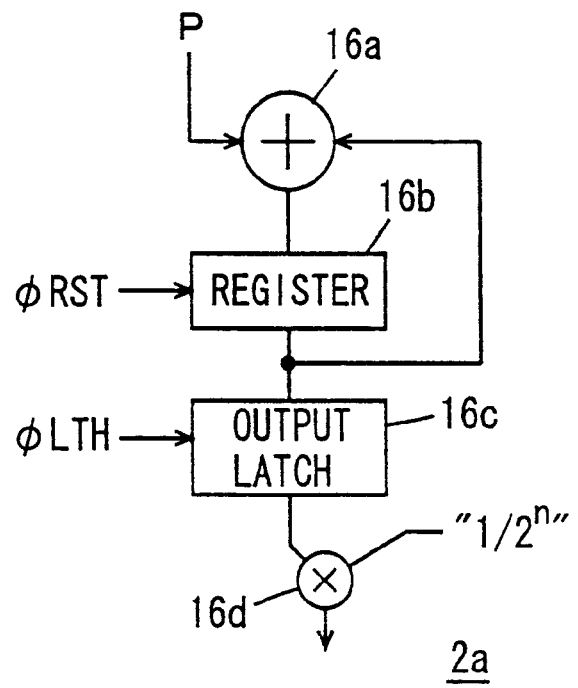
FIG. 9A shows a modification of the filter operation unit shown in FIG. 2.
Figure 9B:
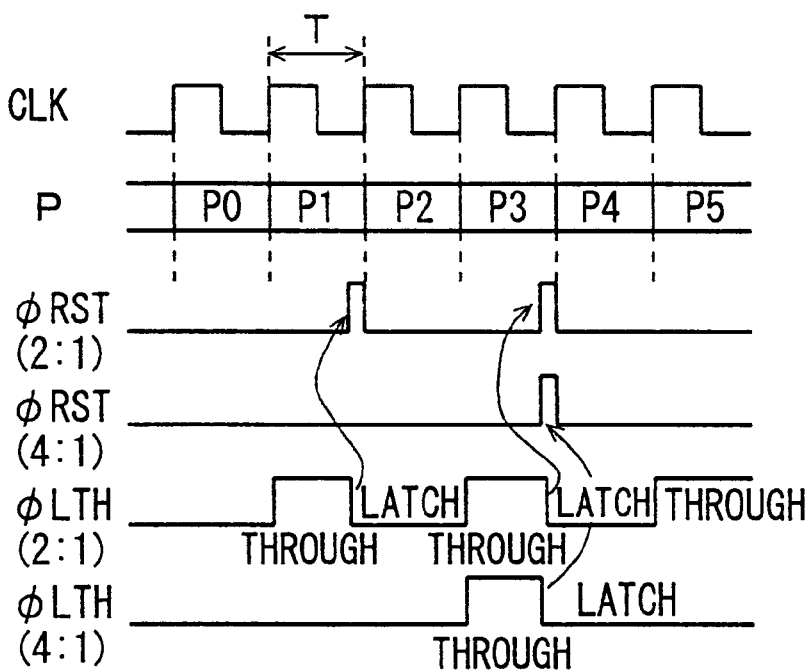
FIG. 9B is a timing chart representing operation of the filter operation unit shown in FIG. 9A.

FIG. 9A schematically shows a structure of a modification of filter operation unit 2a shown in FIG. 2. In FIG. 9A, filter operation unit 2a includes an adder 16a receiving pixel data P at a first input, a register 16b storing the output data of adder 16a, an output latch 16c latching the output data of register 16b, and a multiplier 16d multiplying the output latch data of output latch 16c by a factor of ½$^n$. Adder 16a adds input pixel data P and the pixel data stored in register 16b. Register 16b resets the stored data to "0" in accordance with a reset signal φRST. Output latch 16c selectively attains a through state for taking in the output data of register 16b and a latch state for neglecting the output data of register 16b in accordance with a latch instructing signal φLTH. The factor of ½$^n$ applied to multiplier 16d is set in accordance with the sub-sampling rate. The output data of multiplier 16d is applied to accuracy adjusting circuit 12k shown in FIG. 4. Now, operation of the filter operation unit shown in FIG. 9A will be described with reference to a timing chart of FIG. 9B.

In synchronization with clock signal CLK, pixel data P is applied. In the case where the sub-sampling rate is 2:1, reset signal φRST is activated at every two clock cycles, and latch instructing signal φLTH sets output latch 16c to the through state at every two clock cycles. In the case of the sub-sampling rate of 2:1, when the sum of data of two pixels is stored in register 16b, output latch 16c latches the sum. When output latch 16c attains the latch state, register 16d is reset, and the data stored therein is set to "0". Accordingly, register 16b stores the sum of each two pixels, and output latch 16c latches the sum of the two pixel data. When the sub-sampling rate is 2:1, multiplier 16d performs the multiplication by a factor of ½. Accordingly, multiplier 16d generates the average value of data of two pixels.

If the sub-sampling rate is 4:1, latch instructing signal φLTH sets output latch 16c to the through state at every four clock cycles to cause output latch 16c to take in the output data of register 16b. Reset signal φRST is activated to reset the stored data of register 16b when latch instructing signal φLTH is activated, and output latch 16c enters the latch state. Therefore, register 16b stores the sum of four pixel data, and output latch 16c latches this sum of the four pixel data. In the case of the sub-sampling rate of 4:1, multiplier 16d performs the multiplication by a factor of $½^2$ to generate the average value of four pixel data. By setting the accumulation cycle of the accumulator shown in FIG. 9A in accordance with the sub-sampling rate, sub-sampling of the input pixel data can be easily performed. The multiplier 16d is formed of a shifter shifting the bit positions toward the lower bit positions. This shifter may be formed of a shift register circuit, or may be achieved merely by switching between interconnection paths. By shifting the interconnections of the input portion by one bit with respect to the interconnections of the output portion, the sub-sampling at the sub-sampling rate of 2:1 is achieved. By shifting downward the interconnections of the input portion by two bits with respect to the interconnections of the output portion, two-bit-shift operation can be achieved. In this case, the interconnection line of an upper bit is connected to the ground potential for generating the data of "0".

The sub-sampling rates of 2:1 and 4:1 have been described. However, the sub-sampling rate may be 8:1, and generally may be $2^n$:1.

In the filtering process described before, the average value of input pixel data is obtained. In this filtering processing, the weight may be changed in accordance with the position of the pixel in a processing unit. In the case of the sub-sampling rate of 4:1, the filtering may be performed with the weight of ½ for the first and fourth pixels and the weight of 1 for the second and third pixels. The structure for changing the weight can be achieved by providing a multiplier, performing multiplication by a weight factor in the input portion of the adder of the structure shown in FIG. 4.

Second Modification of Filer Operation Unit

Figure 10:
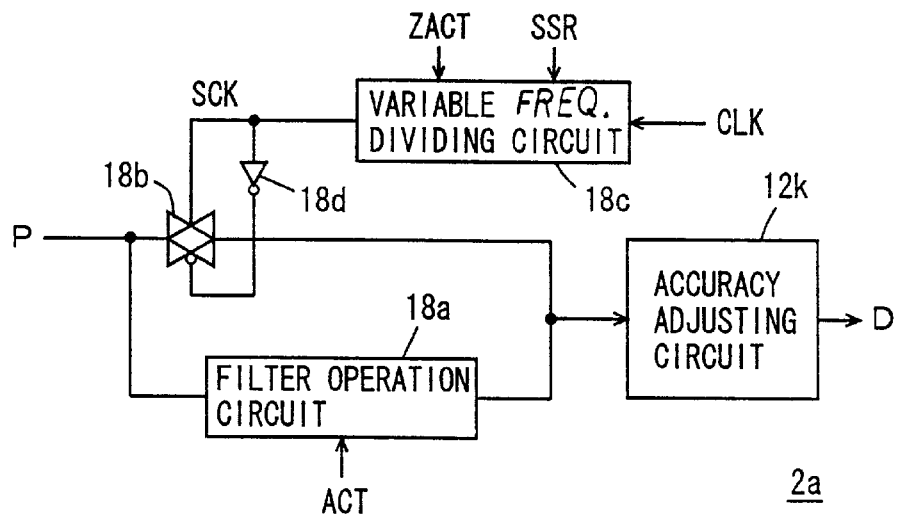
FIG. 10 shows still another structure of the filter operation unit shown in FIG. 2.

FIG. 10 shows another modification of filter operation unit 2a. In FIG. 10, filter operation unit 2a includes a filter operation circuit 18a which is activated upon activation of activating signal ACT, to perform a predetermined filtering arithmetic operation on input pixel data P, a transmission gate 18b which passes input pixel data P in response to sampling clock signal SCK applied from a variable frequency dividing circuit 18c, and an accuracy adjusting circuit 12k which carries out accuracy adjustment on pixel data applied from one of transmission gate 18b and filter operation circuit 18a.

Variable frequency dividing circuit 18c is activated upon activation of an activating signal ZACT, to produce sampling clock signal SCK with a predetermined frequency dividing ratio determined in accordance with sub-sampling rate information SSR, in synchronization with clock signal CLK. Sampling clock signal SCK from variable frequency dividing circuit 18c is also applied to a transmission gate 18b via an inverter 18d.

Variable frequency dividing circuit 18c is formed of, e.g., shift register circuits connected in a ring form and having the number of stages variable. The number of stages of the shift registers is determined in accordance with sub-sampling rate information SSR, and the shift register to be initially set to "1" is also determined in accordance with sub-sampling rate information SSR.

Figure 11A:
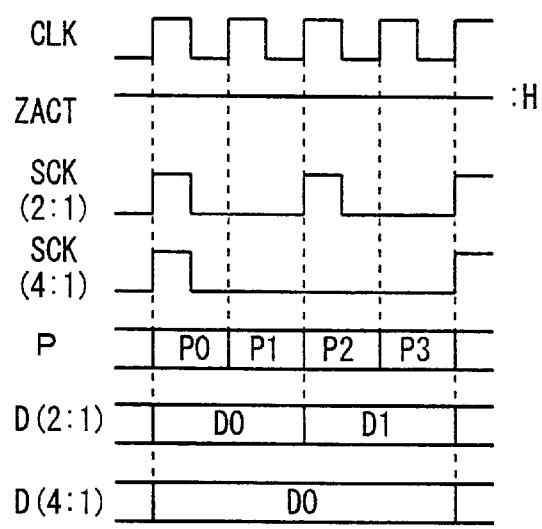
FIGS. 11A and 11B are timing charts representing operation of the filter operation unit shown in FIG. 10.
Figure 11B:
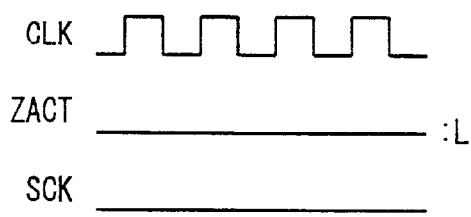

Activating signals ACT and ZACT are complementary with each other. When filter operation circuit 18a is active, variable frequency dividing circuit 18c is inactive. Conversely, when variable frequency dividing circuit 18c is active, filter operation circuit 18a is inactive. Operation of filter operation unit 2a shown in FIG. 10 will now be described with reference to FIGS. 11A and 11B.

Pixel data P is input in synchronization with clock signal CLK. When activating signal ZACT is active at H-level, variable frequency dividing circuit 18c is activated. When filter operation circuit 18a is inactive, transmission gate 18b passes the pixel data in accordance with sampling clock signal SCK applied from variable dividing circuit 18c. When the sub-sampling rate is 2:1, sampling clock signal SCK rises to H-level at every two clock cycles of clock signal CLK, and transmission gate 18b is turned on at every two clock cycles. When sub-sampling rate is 4:1, sub-sampling clock signal SCK attains H-level and transmission gate 18b is turned on at every four clock cycles. Therefore, input pixel data P, and particularly the pixel data in the leading position of the sub-sampling unit is selected and applied to accuracy adjusting circuit 12k.

When filter operation circuit 18a performs the predetermined filtering and arithmetic operation, activating signal ZACT is at L-level, and variable frequency dividing circuit 18c is inactive. In this state, sampling dock signal SCK maintains L-level, and transmission gate 18e is in the off state. Filter operation circuit 18a has the foregoing structure shown in FIG. 4 or 9A. In this state, therefore, predetermined filtering and arithmetic operation is effected on the input pixel data to produce a sub-sampled pixel data.

In the case where the input pixel data is to be merely selected without performing the above filtering and arithmetic operation, the sub-sampled pixel data can be generated in accordance with early timing because the filtering and arithmetic operation is not required (and the time for the arithmetic operation can be eliminated). Thereby, the fast operation can be performed.

In the structure of the filter operation unit shown in FIG. 10, accuracy adjusting circuit 12k is provided commonly for transmission gate 18b and filter operation circuit 18a. However, accuracy adjusting circuit 12k may be provided in filter operation circuit 18a, and the pixel data from transmission gate 18b may be stored directly into the memory.

The structure for selectively activating filter operation circuit 18a may be achieved, for example, by providing an AND gate receiving pixel data P and activating signal ACT in the input section. When activating signal ACT is active at H-level, the AND gate operates as a buffer circuit, and passes pixel data P therethrough. When activating signal ACT is inactive, transfer of pixel data P is inhibited. In variable frequency-dividing circuit 18c, the AND circuit receives clock signal CLK and activating signal ZACT, and the clock signal for frequency division is produced.

Figure 12:
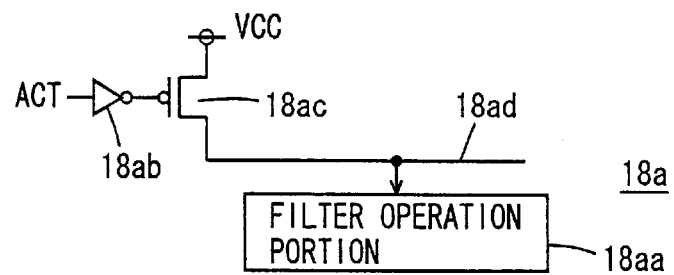
FIG. 12 schematically shows a structure of an activation control portion in the filter operation unit shown in FIG. 10.

FIG. 12 schematically shows another structure of the activation controller in filter operation circuit 18a. In FIG. 12, filter operation circuit 18a includes a filter operation unit 18aa performing predetermined arithmetic operation, an inverter 18ab inverting activating signal ACT, and a p-channel MOS transistor 18ac turned on to connect power supply node VCC to an internal power supply line 18ad when the output signal of inverter 18ab is at L-level. Filter operation unit 18aa receives, as one operation power supply voltage, this power supply voltage on internal power supply line 18ad, and executes the predetermined filtering and arithmetic operation.

In the structure shown in FIG. 12, when activating signal ACT is inactive at L-level, the output signal of inverter circuit 18ab is at H-level, and MOS transistor 18ac is off. Therefore, internal power supply line 18ad is isolated from power supply node VCC so that internal power supply line 18ad is discharged to the ground voltage level. Accordingly, the internal node of filter operation unit 18aa is fixed to the ground voltage level, and the operation of the unit 18aa stops. The power supply structure shown in FIG. 12 may be provided for variable frequency dividing circuit 18c. By providing the power supply controller shown in FIG. 12, the circuitry to be inactive can be reliably held in the inactive state so that the current consumption can be reduced.

Accuracy adjusting circuit 12k is formed of, e.g., a bit width reducing circuit for achieving fast operation, and utilizes the connection between interconnection lines for merely reducing the number of data bits. For example, 8-bit data is reduced to 7-bit data. Alternatively, accuracy adjusting circuit 12k may be adapted to round off or up the 8-bit data to 7-bit data.

Structure of Search Area

Figure 13A:
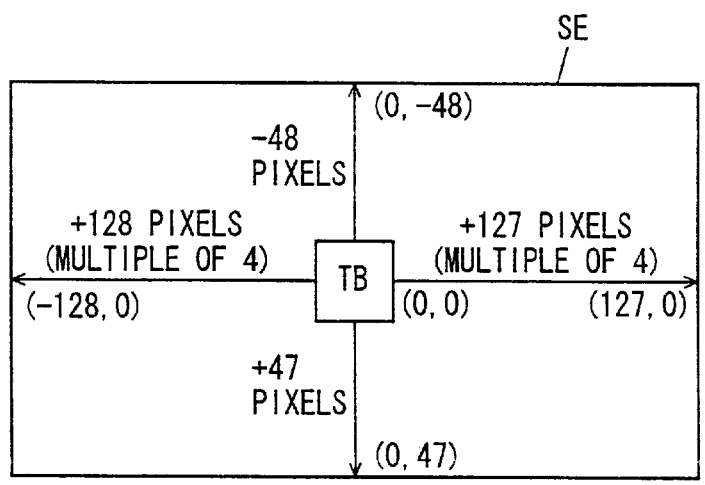
FIG. 13A shows a search area in the 4-to-1 sub-sampling mode.

FIG. 13A schematically shows a structure of search area SE in the 4-to-1 sub-sampling mode. In the 4-to-1 sub-sampling mode shown in FIG. 13A, horizontal vector component is set in a range from −128 to +127 and the vertical vector component is set in a range from −48 to +47. In the vertical direction, 96 pixels or 96 vertical vector components are present. In the horizontal direction, 252 horizontal vector components, i.e., 252 pixels (estimation points) are present. In the horizontal direction, one pixel is extracted as a representative point from each unit formed of four pixels. In FIG. 13A, "multiple of 4" is depicted together with +127 pixels. This is because the estimation is effected on the vector component of a multiple of 4 among 128 horizontal vector components from 0 to +127.

Figure 13B:
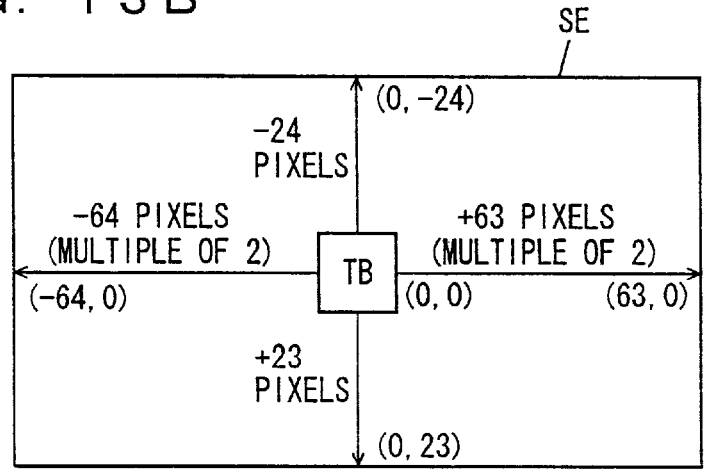
FIG. 13B shows a search area in the 2-to-1 sub-sampling mode.

FIG. 13B shows a structure of a search area SE in the 2-to-1 sub-sampling mode. In the 2-to-1 sub-sampling mode, search area SE is defined by the horizontal vector components from −64 to +63 and the vertical vector components from −24 to +23. In the 2-to-1 sub-sampling mode, two pixels in the horizontal direction is sub-sampled to one pixel. Accordingly, a block having a horizontal vector component of a multiple of 2 is present in the area of pixels (estimation points) from 0 to +63.

Figure 14:
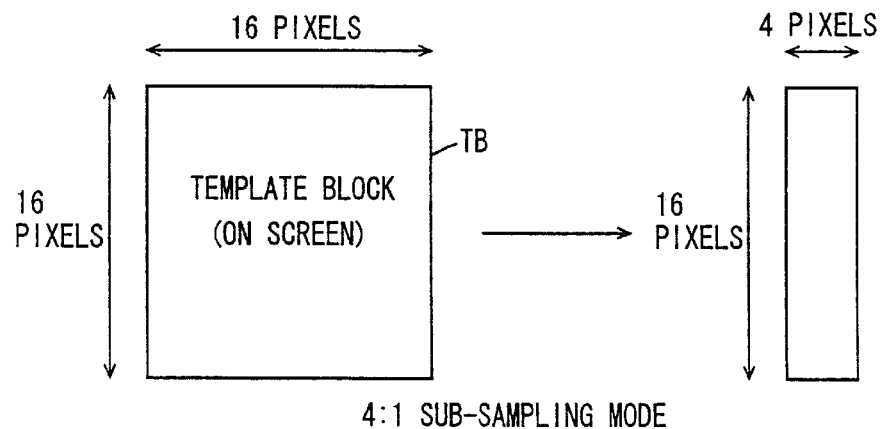
FIG. 14 schematically shows a structure of the template block in the 4-to-1 sub-sampling mode.

FIG. 14 shows a structure of the template block. Template block TB includes pixels arranged in 16 rows and 16 columns on the screen. In the 4-to-1 sub-sampling mode, four pixels adjacent in the horizontal direction are sub-sampled to one pixel so that the template block is formed of the pixels in 16 rows and 4 columns.

Figure 15:
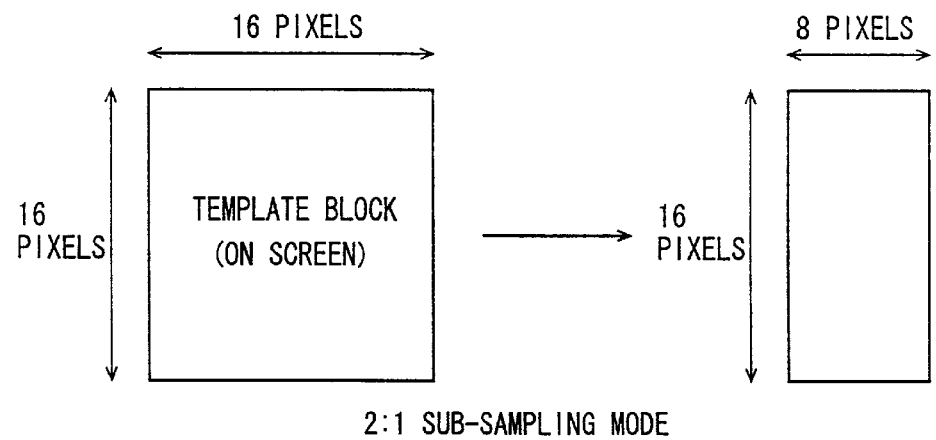
FIG. 15 schematically shows a structure of the template block in the 2-to-1 sub-sampling mode.

FIG. 15 shows a structure of the template block in the 2-to-1 sub-sampling mode. In this 2-to-1 sub-sampling mode, adjacent two pixels in the template block are sub-sampled to one pixel so that the template block is formed of the pixels in 16 rows and 8 columns. The motion vector detection is performed using search window pixel data and template block pixel data which are sub-sampled as described above.

A search area in the 4-to-1 sub-sampling mode is different from that in 2-to-1 sub-sampling mode, and the number of horizontal vector components is reduced to ¼ times and ½ times, respectively. Accordingly, no increase occurs in processing time even if the horizontal search area increases in area by four times or two times.

Structure of Operation Section

Figure 16:
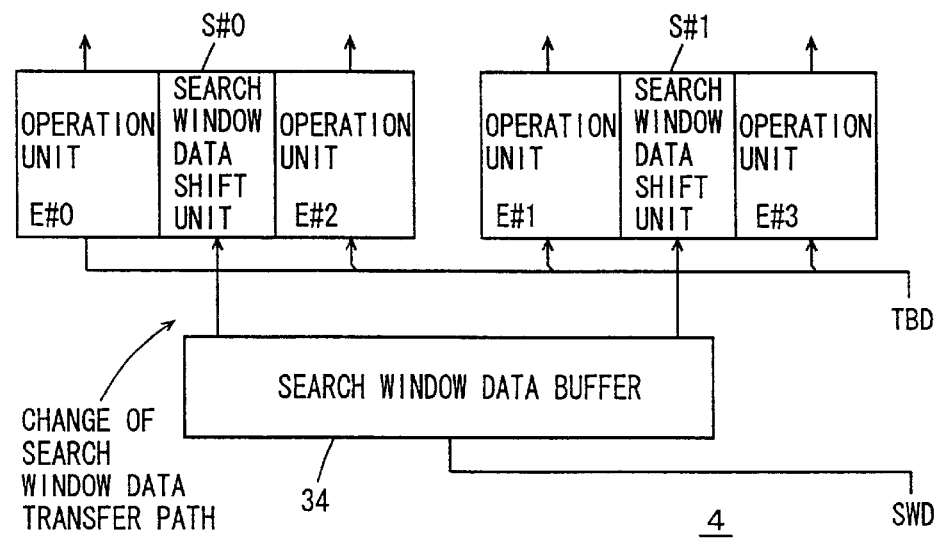
FIG. 16 schematically shows a structure of an operation section shown in FIG. 1.

FIG. 16 schematically shows a structure of operation section 4 shown in FIG. 1. In FIG. 16, operation section 4 includes a plurality of operation units E#0–E#3 each of which includes a plurality of element processors arranged in rows and columns and calculates the estimation value from sub-sampled pixel data, a search window data shift unit S#0 which includes shift registers shared between operation units E#0 and E#2 and arranged corresponding to the element processors included in these operation units E#0 and E#2 and shifts the search window pixel data in one direction, a search window data shift unit S#1 which includes shift registers arranged corresponding to operation units E#1 and E#3 and transfers the search window pixel data in one direction, and a search window data buffer 34 which is selectively coupled to search window data shift units S#0 and S#1 in accordance with the sub-sampling rate and stores and transfers in one direction the search window pixel data.

Each of operation units E#0–E#3 stores the pixel data in corresponding element processors arranged corresponding to representative positions (sub-sampled pixel data position) of a plurality of pixels adjacent each other in the horizontal direction on the screen. Each element processor performs a predetermined arithmetic operation on the template block pixel data stored therein and the search window block pixel data supplied from a corresponding shift register. In this embodiment, each element processor obtains an absolute value of the difference.

Each of operation units E#0–E#3 includes a summing part, for adding the result values of operations by respective element processors in a predetermined order to obtain a total sum, and thereby calculates the estimation value. As will be described later, these element processors store pixel data of a plurality of template blocks, and calculate, in a time division multiplex manner, the estimation value components indicating the degrees of correlation between the plurality of template blocks and a common search window block, respectively.

Element processors in operation units E#0–E#3 always store the template block pixel data during a cycle (operation cycle) for obtaining a motion vector for this template block. Search window pixel data transferred through search window data buffer 34 is shifted by one pixel in search window data shift units S#0 and S#1, to shift the vertical vector component one by one. The transfer paths of data in search window data shift units S#0 and S#1 as well as search window data buffer 34 are determined depending on the sub-sampling rate. Search window data buffer 34 includes a delay buffer circuit for delaying an applied search window pixel data by a predetermined time for outputting.

Search window data buffer 34 stores the pixel data in a side region, i.e., the region other than a search window block (i.e., the block of search window where calculation of the estimation value is being performed) in the search window.

By changing the transfer path through which search window pixel data is transferred via search window data buffer 34, it becomes possible to change a range of search in the vertical direction. Change in horizontal component is allowed by changing the sub-sampling rate.

Figure 17:
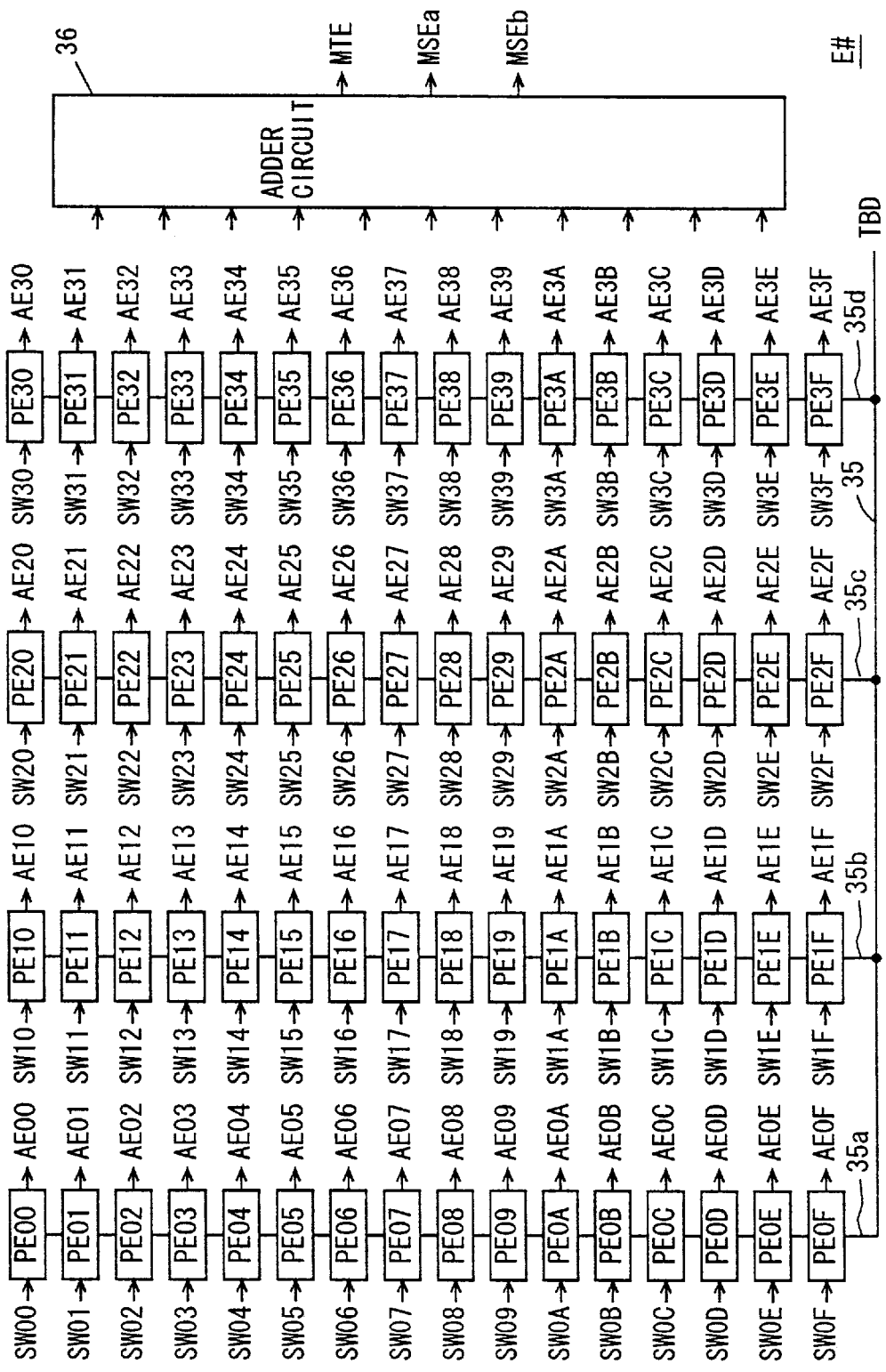
FIG. 17 schematically shows a structure of the operation unit shown in FIG. 16.

FIG. 17 shows a structure of one of operation units E#0–E#3 shown in FIG. 16. FIG. 17 shows one operation unit E# as a representative example. In FIG. 17, operation unit E# includes element processors PE00–PE3F arranged in 16 rows and 4 columns. Shift registers in the search window data shift unit are arranged corresponding to element processors PE00–PE3F. Data SW00–SW3F stored in the shift registers are applied to corresponding element processors PE00–PE3F, respectively. Template block pixel data TBD is loaded into element processors PE00–PE3F via a data bus 35. A data bus connected to global data bus 35 is arranged commonly for element processors PEi0–PEiF arranged in one column. More specifically, template block pixel data is loaded into element processors PE00–PE0F via a data bus 35a. A data bus 35b is arranged commonly for element processors PE10–PE1F for transmitting template block pixel data thereto. Element processors PE20–PE2F receive template block pixel data via a data bus 35c. Element processors PE30–PE3F receive template block pixel data via a data bus 35d.

Element processors PE00–PE3F store different pixel data of the same template block. Each of element processors PE00–PE3F obtains and outputs an absolute value AE of the difference between a search window block pixel data applied from the shift register and a template block pixel data stored therein. Absolute difference values AE00–AE3F from element processors PE00–PE3F are applied in parallel to an adder circuit 36.

Adder circuit 36 adds received absolute difference values AE00–AE3F in a predetermined order, to produce estimation values MTE, MSEa and MSEb according to a plurality of prediction modes. Estimation value MTE represents the estimation value for all the pixel data of the template block, and is referred to as a template block mode estimation value. Estimation value MSEa is an estimation value obtained using the pixel data of a sub-template block, and estimation value MSEb is an estimation value calculated using the pixel data of the other sub-template block.

As will be described later, one template block includes two sub-template blocks. If a template block is formed of frame pixels, the template block includes both even and odd field pixels. In the case where a template block is formed of field pixels, the template block can be divided into an upper half and a lower half template block. In accordance with the prediction mode which is actually used, the addition is performed. Addition in adder circuit 36 is executed by distributing absolute difference values (estimation value components) AE00–AE3F received from element processors PE00–PE3E, respectively. This is because the positions where element processors PE00–PE3E are arranged correspond to the positions of representative pixels in the template block, respectively, and sorting of pixel data of the upper sub-template block, lower sub-template block, even field sub-template block and odd field sub-template block is easily achieved by the positions of the element processors. Distribution of the estimation value components in adder circuit 36 is achieved merely by using interconnection lines.

Figure 18:
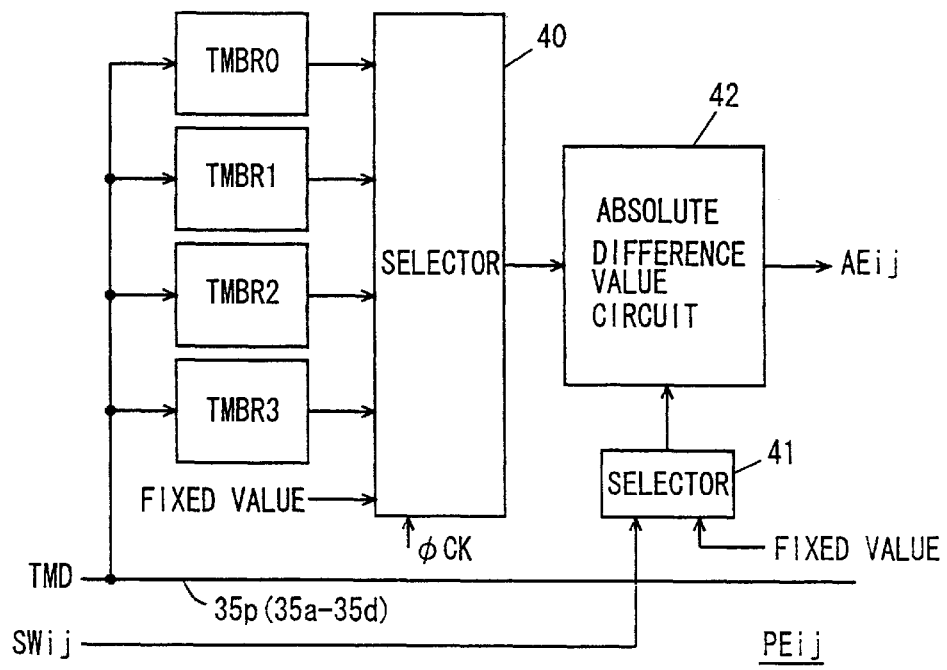
FIG. 18 schematically shows a structure of an element processor shown in FIG. 17.

FIG. 18 schematically shows a structure of element processor PEij. In FIG. 18, element processor PEij includes data registers TMBR0–TMBR3 arranged in parallel for storing template block pixel data, a selector 40 for selecting one of data registers TMBR0–TMBR3 and a fixed value in accordance with a select signal φCK, a selector 41 for selecting one of search window block pixel data SWij and a fixed value in accordance with a select signal (not shown), and an absolute difference value circuit 42 for obtaining an absolute difference value (absolute error value) of the data applied from selectors 40 and 41.

Data registers TMBR0–TMBR3 store pixel data at the same position in different template blocks, respectively. Selector 40 successively selects these data registers TMBR0–TMBR3 in accordance with select signal φCK. Selectors 40 and 41 select and apply the fixed value to absolute difference value circuit 42 if received search window block pixel data SWij is, e.g., a pixel data outside the search area. When the fixed value is selected, the absolute difference value in absolute difference value circuit 42 is set equal to zero or a minimum value, and estimation value component AEij does not contribute to the estimation value. Data registers TMBR0–TMBR3 are supplied with template block pixel data TMD via data bus 35b (35a–35d). An addressed data register stores template block pixel data TMD.

Figure 19A:
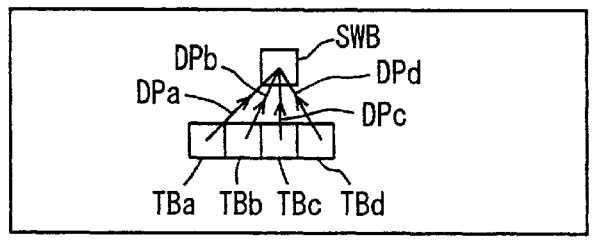
FIG. 19A shows a correspondence between a search window block and template blocks stored in the element processor shown in FIG. 18.

FIG. 19A schematically shows a positional relationship between four template blocks TBa–TBd and one search window block SWB. The search area is much larger than the template block (see FIGS. 13A and 13B). Therefore, template blocks TBa–TBd can share a search window block in the search area. Template blocks TBa–TBd have displacement vectors DPa–DPd with respect to search window block SWD, respectively. By using common search window block SWB, the estimation values with respect to the four template blocks are calculated in a time division multiplexed manner.

Figure 19B:
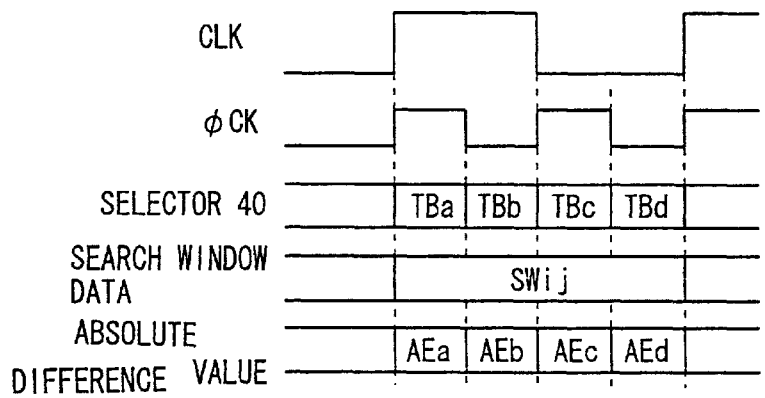
FIG. 19B is a timing chart representing operation of the element processor shown in FIG. 18.

As shown in FIG. 19B, selector 40 is controlled using select signal φCK of a frequency four times larger than that of clock signal CLK. Selector 40 successively selects data TBa–TBd stored in data registers TMBR0–TMBR3 in accordance with select signal φCK. Search window data SWij is transferred in accordance with clock signal CLK. Therefore, absolute difference value circuit 42 produces estimation value components AEa–AEd for template blocks TBa–TBd in a time division multiplexed manner, respectively.

The search areas of template blocks TBa–TBd are different (horizontally shifted by 16) from each other. Therefore, motion vectors of the respective template blocks can be detected in a pipeline manner, and fast detection of the motion vectors can be achieved. Since the common search window block SWB is used for calculating the motion vector estimation values of the plurality of template blocks TBa–TBd, search window pixel data can be efficiently utilized, and fast processing can be performed.

Figure 20:
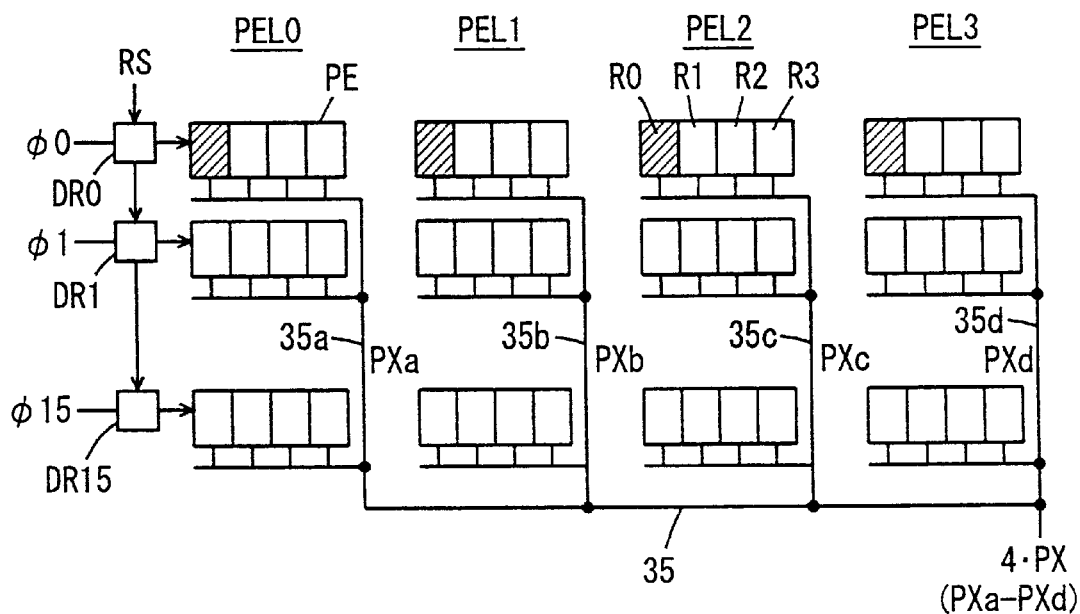
FIG. 20 shows a manner of loading the template block pixel data into the operation unit shown in FIG. 17.

FIG. 20 schematically shows a structure of a controller for writing template block pixel data into the element processors. In FIG. 20, drive circuits DR0–DR15 receiving load clock signals φ0–φ15 and register select signal RS are provided for respective rows of element processors PE. Element processor PE includes registers R0–R3 (TMBR0–TMBR3) for storing template block pixel data. Register select signal RS designates one of four registers R0–R3. Load clock signals φ0–φ15 designate element processors in one row among the element processors in 16 rows. Data bus 35 transmits data 4.PF (PFa–PFd) of four pixels in parallel. Data buses 35a–35d are provided corresponding to element processor columns PEL0–PEL3 and transmit pixel data PXa–PXd each related to one pixel, respectively. Accordingly, pixel data is loaded into one among four registers R0–R3 in each of the element processors in one row selected by register select signal RS and load clock signals φ0–φ15. FIG. 20 shows by way of example a state where template block pixel data is written into registers R0 of element processors in the first row.

When data bus 35 transmits one-pixel data, such a structure may be employed that drive circuits DR0–DR15 are provided for each of element processor columns PEL0–PEL3, and the element processors further receive column select signals. Writing can be achieved one pixel at a time.

Figure 21:
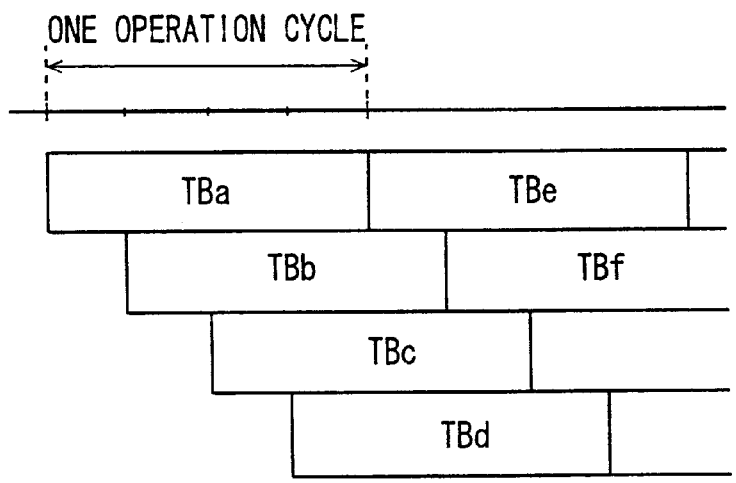
FIG. 21 schematically shows an estimation value calculating sequence of the operation unit shown in FIG. 17.

Registers R0–R3 (TMBR0–TMBR3) for storing four template block pixel data are provided in one element processor, and these registers are selected in a time division multiplexed manner, whereby detection of motion vectors of template blocks can be executed in a pipeline manner. In FIG. 21, template blocks TBa–TBd are processed in the pipeline manner. After the motion vector of template block TBa is detected, the register which has stored the pixel data of this template block TBa stores the pixel data of next template block TBe. One operation cycle itself required for one template block TB is not reduced, but the time required for detecting a motion vector of a template block can be effectively reduced to a quarter owing to the pipeline processing. (Since a motion vector of a template block is already detected when one operation cycle is completed, the motion vector of a different template block is detected at every quarter of the operation cycle.

Structure of Shift Unit

Figure 22:
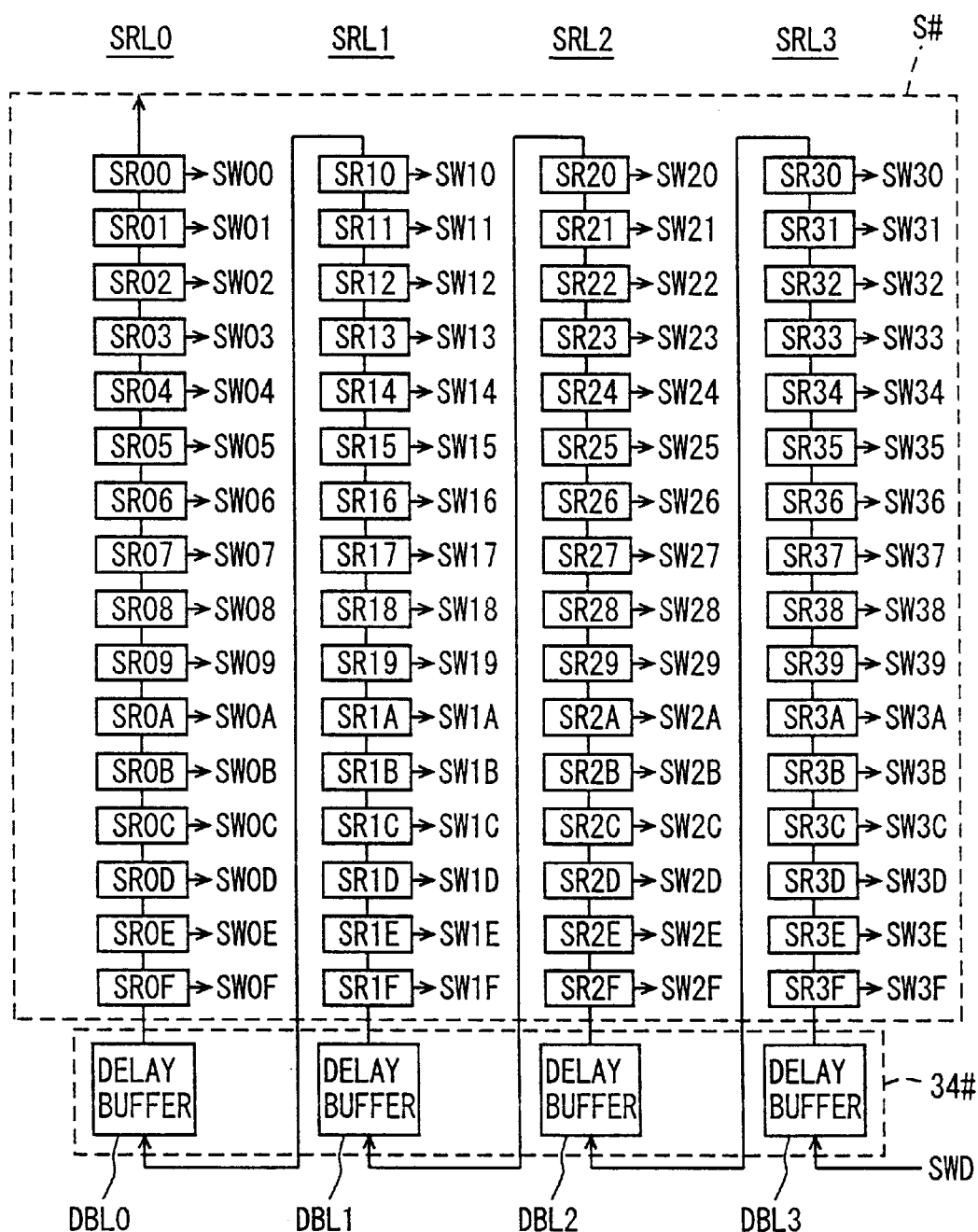
FIG. 22 schematically shows a structure of a shift unit and a data buffer for the search window data shown in FIG. 16.

FIG. 22 shows a structure of the search window data shift unit and the search window data buffer shown in FIG. 16. FIG. 22 shows the structure of one search window data shift unit S#. In FIG. 22, search window data shift unit S# includes shift registers SR00–SR3F. Shift registers SR00–SR3F are arranged corresponding to element processors RE00–PE3F of operation unit E# shown in FIG. 17, respectively. Accordingly, shift registers SR00–SR3F are arranged in 16 rows and 4 columns. Data SW00–SW3F stored in shift registers SR00–SR3F are applied to element processors PE00–PE3F of a corresponding operation unit, respectively. Shift registers SR00–SR3F can transfer the search window pixel data in one direction.

Search window data buffer 34 includes a data buffer circuit 34# provided corresponding to search window data shift unit S#. Data buffer circuit 34# is provided for each of search window data shift units S#0 and S#1. Data buffer circuit 34# includes delay buffers DBL0–DBL3 provided corresponding to shift register columns SRL0–SRL3 of search window data shift unit S#, respectively. Delay buffers DBL0–DBL3 have first-in first-out (FIFO) structures and successively delay an applied search window pixel data by a predetermined time for outputting.

In FIG. 22, shift registers SR00–SR3F included in search window data shift unit S# are connected to delay buffers DBL0–DBL3 such that pixel data can be transferred in one direction. More specifically, the output pixel data of shift register SR30 at the final stage in shift register column SRL3 is applied to delay buffer DBL2 in the next stage. Output pixel data of shift register SR20 at the final stage in shift register column SRL2 is applied to delay buffer DBL1 in the next stage. Output pixel data of shift register SR11 at the final stage in shift register column SRL1 is applied to delay buffer DBL0. Output pixel data of delay buffers DBL0–DBL3 are applied to shift registers SR0F–SR3F in the initial stages of corresponding shift register columns, respectively. Delay buffer DBL3 is supplied with search window pixel data SWD from the search window data memory in input section 2. In an operation cycle, data of one pixel is shifted at every clock cycle. Pixel data of a template block are resident in the element processors of the operation unit, and search window pixel data is shifted by one pixel in the search window data shift unit. This shift by one pixel moves the search window block by one pixel in the vertical direction. This operation will be described in greater detail.

The connection paths between shift register columns SRL0–SRL3 in search window data shift unit S# and delay buffers DBL0–DBL3 in search window data buffer 34# are changed depending on the sub-sampling rate.

Figure 23:
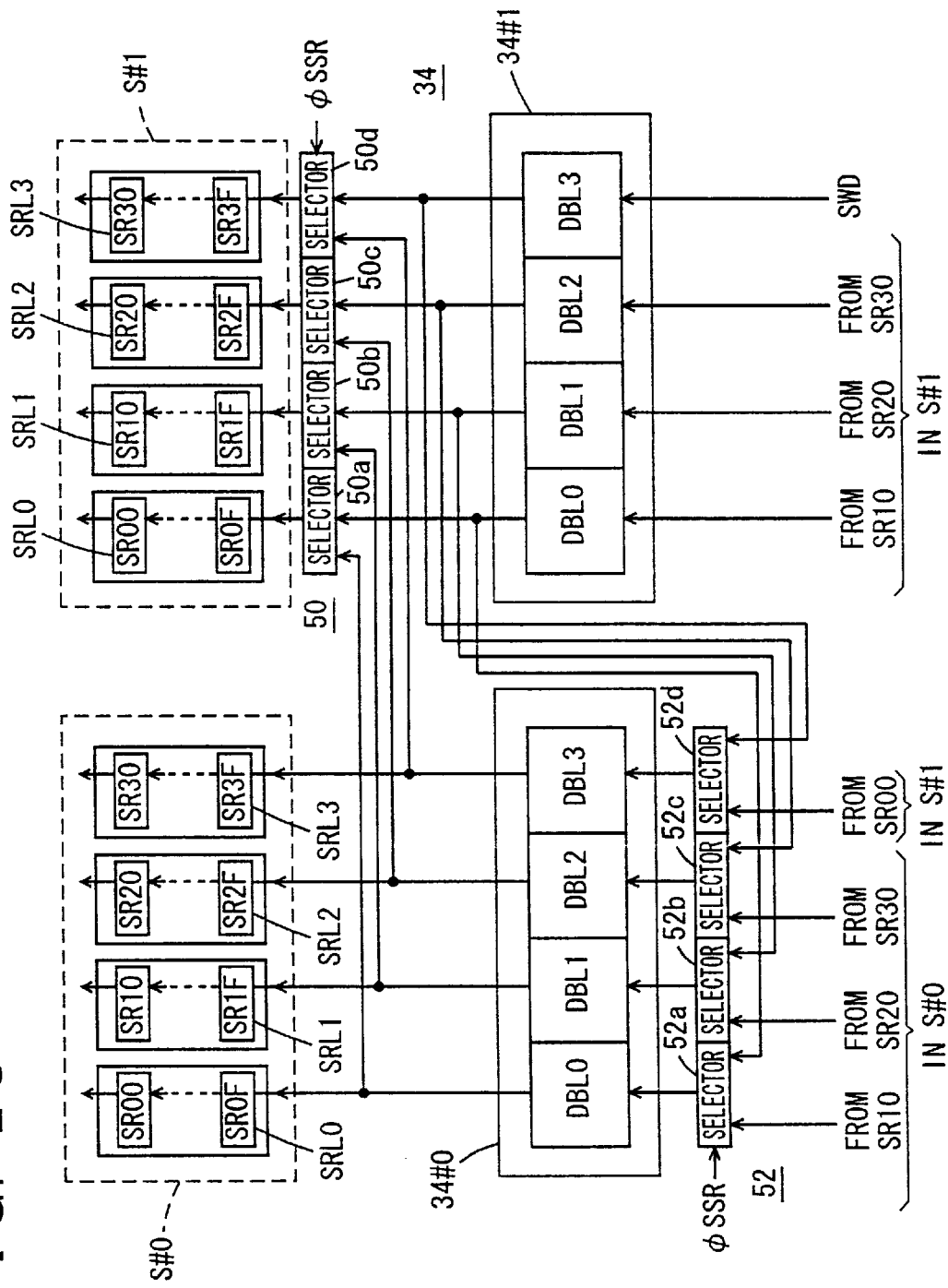
FIG. 23 schematically shows a structure of the search window data buffer shown in FIG. 22.

FIG. 23 shows a more specific structure of search window data buffer 34. In FIG. 23, search window data buffer 34 includes data buffer circuits 34#0 and 34#1 provided corresponding to search window data shift units S#0 and S#1, respectively, a select circuit 50 for selecting and transmitting an output pixel data of one of data buffer circuits 34#0 and 34#1 to search window data shift unit S#1 in accordance with a sub-sampling rate instructing signal φSSR, and a select circuit 52 for selecting and transmitting one of output data of data buffer circuit 34#1 and output pixel data of shift units S#0 and S#1 to data buffer circuit 34#0 in accordance with sub-sampling rate instructing signal φSSR. In these select circuits 50 and 52, the select path is changed in accordance with sub-sampling rate instructing signal φSSR, whereby the transfer path of search window pixel data in the operation section is changed, and the size of search window block is changed in accordance with the sub-sampling rate.

Each of data buffer circuits 34#0 and 34#1 includes delay buffers DBL0–DBL3. Each of delay buffers DBL0–DBL3 is formed of, e.g., an FIFO memory of 48 words. One word corresponds to one pixel data.

Select circuit 50 includes selectors 50a–50d provided corresponding to shift register columns SRL0–SRL3 in search window data shift unit S#1. Selector 50a selects one of the output data of delay buffers DBL0 of data buffers 34#0 and 34#1, for application to shift register SR0F in the initial stage of shift register column SRL0 of shift unit S#1. Selector 50b selects one of output data of delay buffers DBL1 of data buffers 34#0 and 34#1 for application to shift register SR1F in the initial stage of shift register column SRL1 in shift unit S#1. Selector 50c selects one of output data of delay buffers DBL2 of data buffers 34#0 and 34#1 for application to shift register SR2F in the initial stage of shift register column SRL2 in shift unit S#1. Selector 50d selects one of output data of delay buffers DBL3 of data buffers 34#0 and 34#1 for application to shift register SR3F in the initial stage of shift register column SRL3 in shift unit S#1.

Select circuit 52 includes selectors 52a–52d provided corresponding to delay buffers DBL0–DBL3 of data buffer circuit 34#0, respectively. Selector 52a selects one of output data of shift register SR10 at the final stage in shift preceding register column SRL1 located in shift unit S#0 and the output data of delay buffer DBL0 of data buffer circuit 34#1 for application to delay buffer DBL0 of data buffer circuit 34#0. Selector 52b selects one of output data of shift register SR20 at the final stage in preceding shift register column SRL2 located in shift unit S#0 and the output data of delay buffer DBL1 of data buffer circuit 34#1 for application to delay buffer DBL1 of data buffer circuit 34#0. Selector 52c selects one of output data of shift register SR30 at the final stage in preceding shift register column SRL3 located in shift unit S#0 and the output data of delay buffer DBL2 of data buffer circuit 34#1 for application to delay buffer DBL2 of data buffer circuit 34#0. Selector 52d selects one of output data of shift register SR00 at the final stage in preceding shift register column SRL0 located in shift unit S#1 and the output data of delay buffer DBL3 of data buffer circuit 34#1 for application to delay buffer DBL3 of data buffer circuit 34#0.

Output pixel data of delay buffers DBL0–DBL3 of data buffer circuit 34#0 are also applied to initial shift registers SR0F–SR3F of corresponding shift register columns in shift unit S#0, respectively.

In data buffer circuit 34#1, delay buffers DBL0–DBL2 receive output pixel data of shift registers SR10, SR20 and SR30 at the final stages in preceding shift register columns of shift unit S#1, respectively. Delay buffer DBL3 of data buffer circuit 34#1 is supplied with search window pixel data SWD from the pixel data input section.

Figure 24:
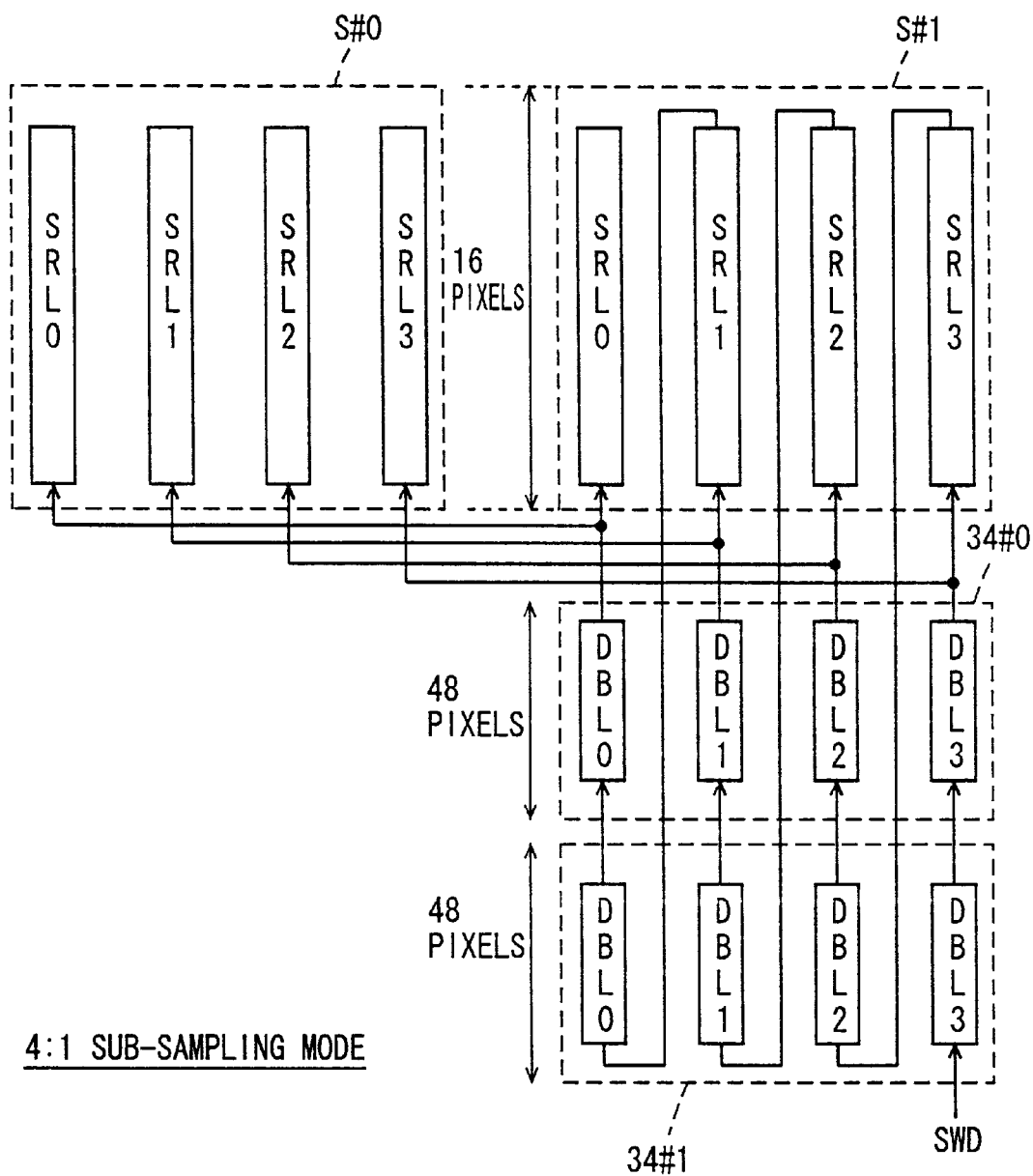
FIG. 24 schematically shows connections between the shift register columns and delay buffers in the 4-to-1 sub-sampling mode.

FIG. 24 schematically shows connection paths between the data buffers and the shift units in the 4-to-1 sub-sampling mode. In the 4-to-1 sub-sampling mode shown in FIG. 24, select circuit 50 selects and applies output pixel data of data buffer circuit 34#0 to shift unit S#1. Select circuit 52 selects and applies output pixel data of data buffer circuit 34#1 to data buffer circuit 34#0. In data buffer circuits 34#0 and 34#1, the delay buffers arranged in the same column are connected in series as shown in FIG. 24. The output pixel data of delay buffers DBL0–DBL3 of data buffer circuit 34#0 are applied to shift register columns SRL0–SRL3 in each of shift units S#0 and S#1, respectively. Therefore, shift units S#0 and S#1 receive the same search window pixel data.

Each of shift units S#0 and S#1 is shared between the two operation units. The sub-sampled template block has a size of 16 pixel rows by 4 pixel columns. In data buffer circuits 34#0 and 34#1, each of delay buffers DBL0–DBL3 stores data of 48 pixels, and therefore each column extending in data buffer circuits 34#0 and 34#1 stores data of 96 pixels. Shift unit S# as well as data buffer circuits 34#0 and 34#1 transfer search window pixel data SWD in one direction. This is because delay buffers DBL0–DBL2 in data buffer circuit 34#1 receive the output pixel data of preceding shift register columns SRL1–SRL3, respectively.

Figure 25:
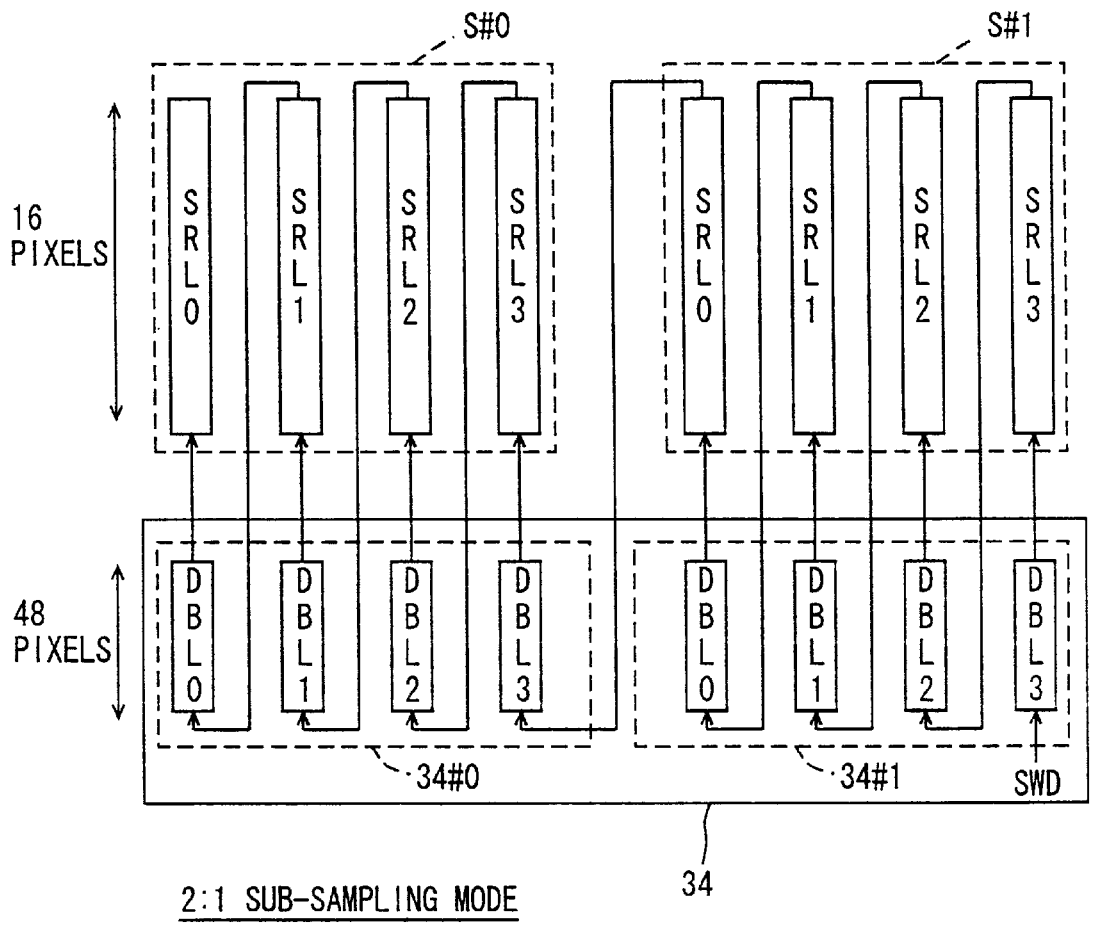
FIG. 25 schematically shows connections between the shift register columns and delay buffers in the 2-to-1 sub-sampling mode.

FIG. 25 schematically shows connection between the search window data buffer circuits and the shift units in the 2-to-1 sub-sampling mode. In the 2-to-1 sub-sampling mode, select circuit 50 shown in FIG. 23 selects and applies the output pixel data of data buffer circuit 34#1 to shift unit S#1. Select circuit 52 selects the output data of the final column SR0 in shift unit S#1 and the output data of upstream columns SRL1–SRL3 in shift unit S#0 for application to shift unit S#0. In this 2-to-1 sub-sampling mode, therefore, data buffer circuit 34#1, shift unit S#1, data buffer circuit 34#0 and shift unit S#0 are connected such that search window pixel data SWD is transferred in one direction along a meandering path. Shift registers SRL0–SRL3 transfer the search window pixel data in one direction through delay buffers DBL0–DBL3 in the succeeding stages, respectively.

According to the connection shown in FIG. 25, a search window block is formed of pixels arranged in 16 rows and 8 columns (because pixel data of the same search window block are stored and shifted in shift units S#0 and S#1). Data buffer circuits 34#0 and 34#1 provide the delay buffers, each of which is interposed between the shift register columns. Each of delay buffers DBL0–DBL3 stores data of 48 pixels. Therefore, the search area is defined between −24 and +23 in the vertical direction. Description will now be given on the operation of detecting a motion vector in each sub-sampling mode.

Operation in 4-to-1 Sub-Sampling Mode

Figure 26:
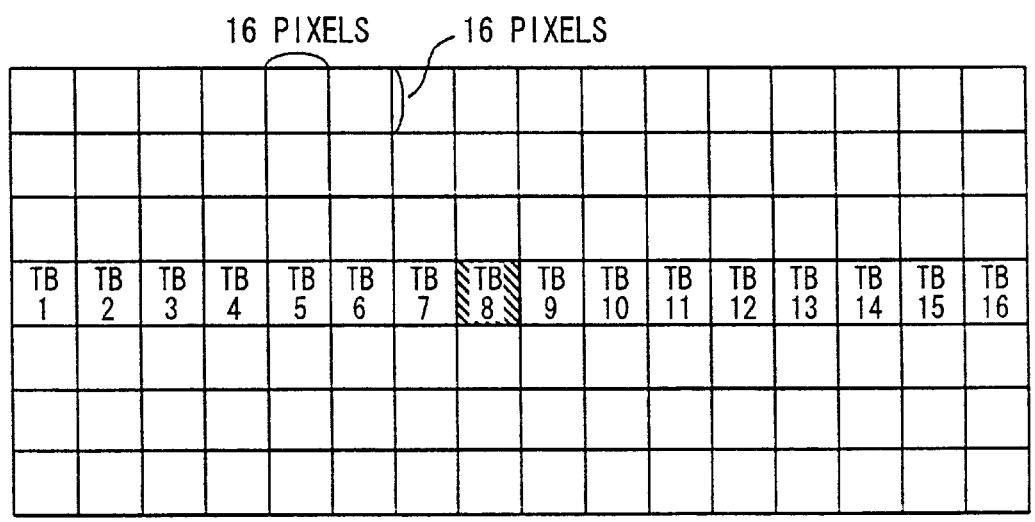
FIG. 26 shows a structure of screen division in the 4-to-1 sub-sampling mode.

It is now assumed that a frame image is divided into macro blocks each having a size of 16 pixels by 16 pixels as shown in FIG. 26. FIG. 26 shows an example, in which 16 divided blocks are present in the horizontal direction, and 7 blocks are present in the vertical direction. This shown region corresponds to the search area of macro block TB8. It is now assumed that macro block TB8 is the block to be coded, i.e., the template block.

Figure 27:
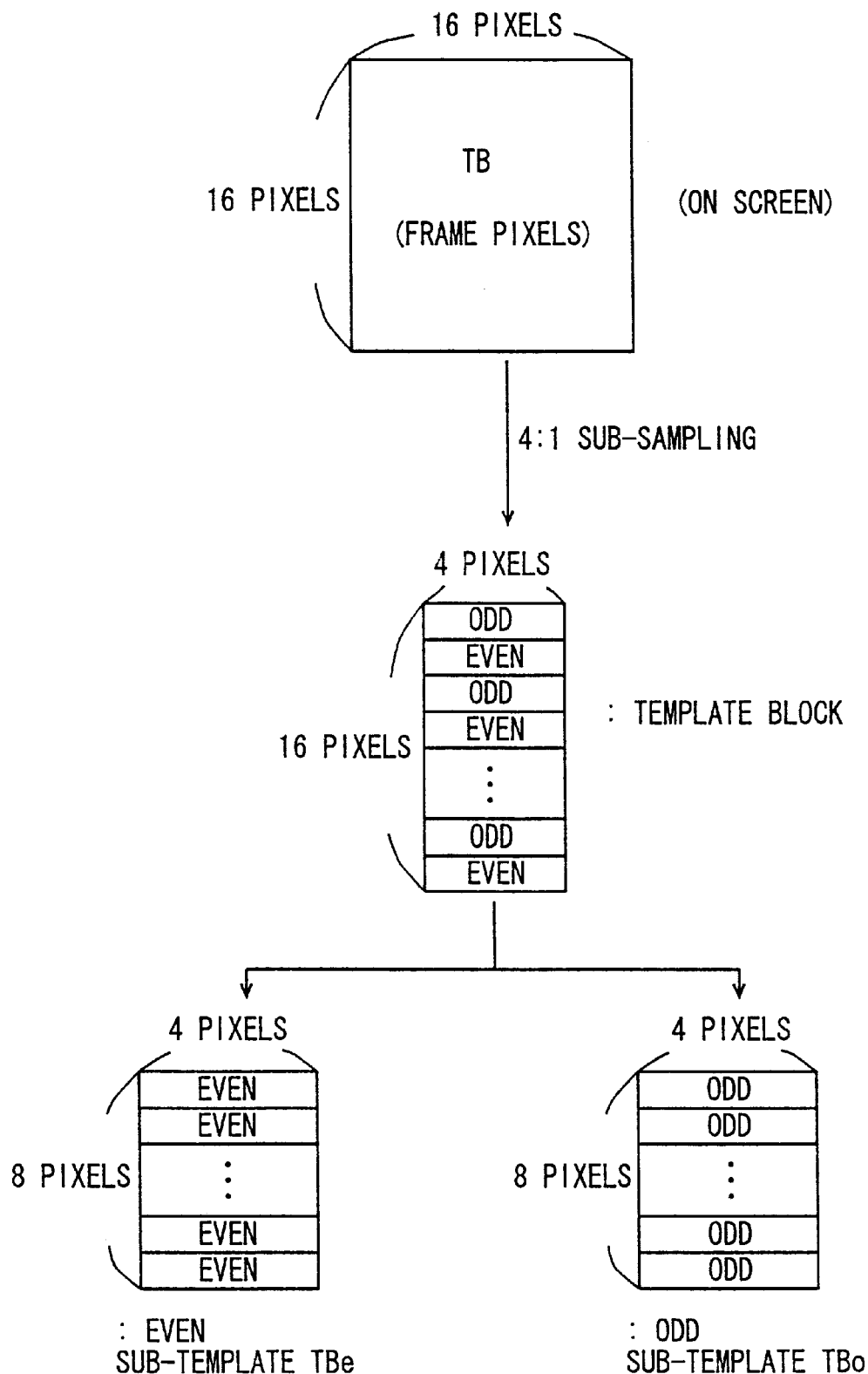
FIG. 27 schematically shows a structure of a search window block and a template block in the 4-to-1 sub-sampling mode.

As shown in FIG. 27, template block TB on the screen has a size of 16 pixels by 16 pixels. Template block TB is formed of frame pixels, and includes pixel data in the even and odd fields.

When input section 2 performs the 4-to-1 sub-sampling, 16 pixels in the horizontal direction are sub-sampled to 4 pixels. Therefore, the template block stored in the operation section forms sub-sampled template block of 4 pixels in the horizontal direction and 16 pixels in the vertical direction. In this sub-sampled template block, pixel data of odd field ODD and pixel data of even field EVEN are arranged alternately in the vertical direction. In the sub-sampled template block, an even sub-template formed of pixels in the even field includes pixels arranged in 8 rows and 4 columns. Likewise, an odd sub-template formed of pixels in odd fields ODD is formed of the pixels in 8 rows and 4 columns. Detection of the motion vectors are performed in parallel on the template block, even sub-template block TBe and odd sub-template block TBo.

Figure 28:
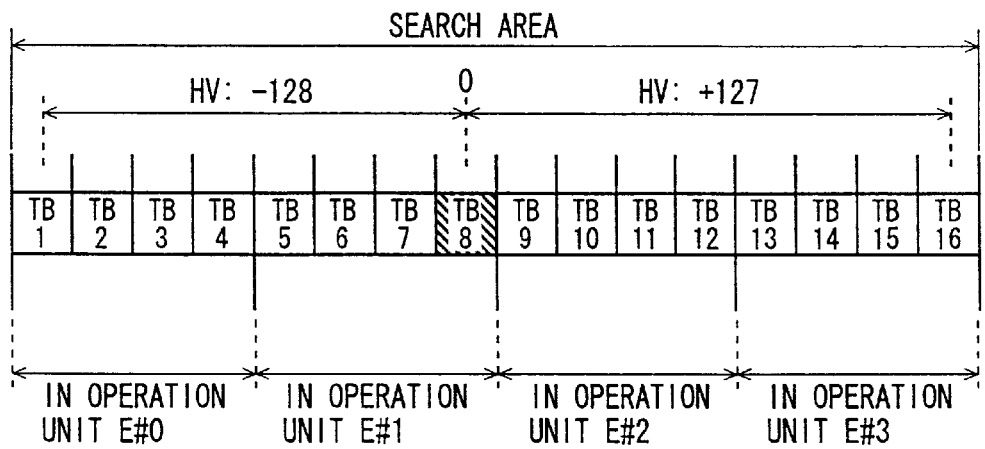
FIG. 28 shows a state of storage of template block pixels in the operation units in the first embodiment of the invention.

In the case of 4-to-1 sub-sampling, as shown in FIG. 28, the motion vector is searched in the area of horizontal vector components between −128 and +127. In connection with template block TB8, template blocks TB1–TB16 aligned in the horizontal direction are included in the above search area. For 16 template blocks TB1–TB 16, motion vectors are detected in a pipeline manner. Operation unit E#0 stores the pixel data of template blocks TB1–TB4, and operation unit E#1 stores the pixel data of template blocks TB5–TB8. Operation unit E#2 stores the pixel data of template blocks TB9–TB12, and operation unit E#3 stores the pixel data of template blocks TB13–TB16. The pixel data of these four template blocks are stored in four template block data registers TMBR0–TMBR3 (R0–R3) in respective element processors as shown in FIG. 18.

In the case of 4-to-1 sub-sampling, data buffer circuits 34#0 and 34#1 are connected in series. Data buffer circuits 34#0 and 34#1 connected in series store data of 96 pixels in the vertical direction. Shift units S#0 and S#1 are supplied with the same search window pixel data. Each of shift units S#0 and S#1 contains the shift registers arranged in 16 rows and 4 columns. These shift registers store the search window pixel data.

Figure 29:
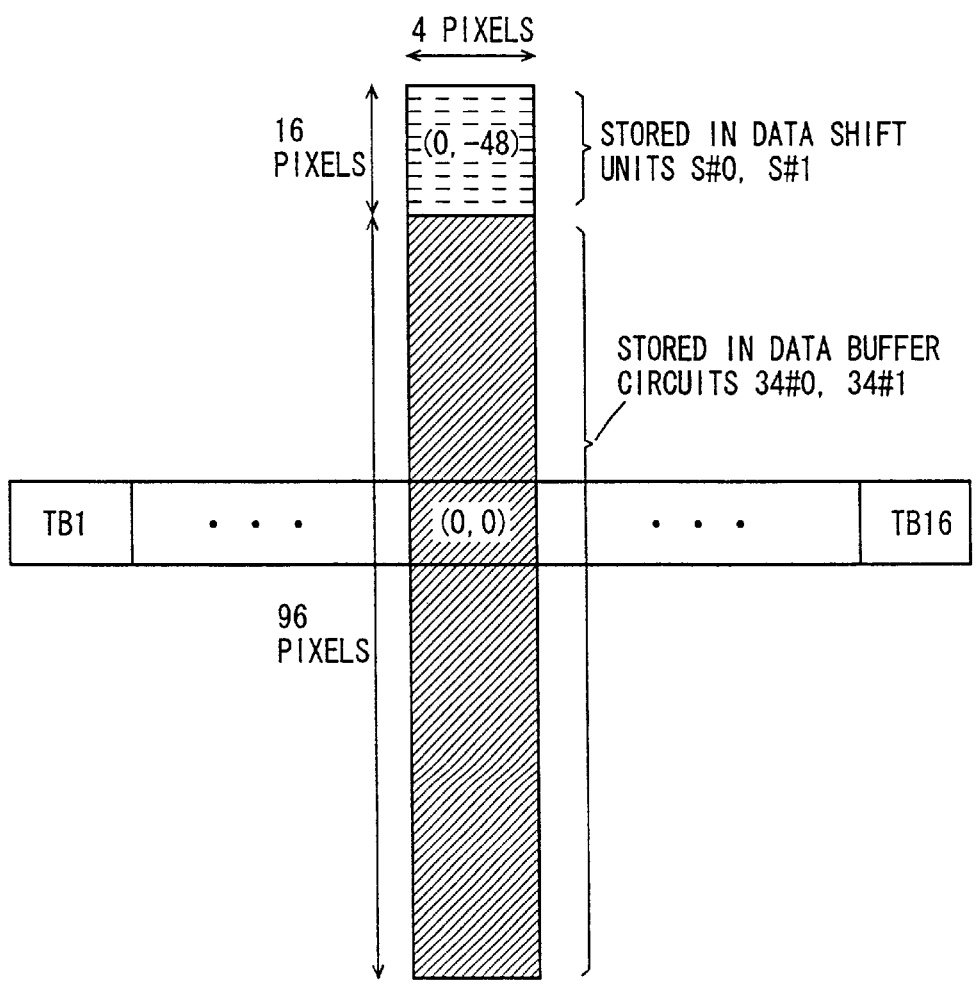
FIG. 29 schematically shows a state of data stored in the operation unit in the 4-to-1 sub-sampling mode.

FIG. 29 shows a state where the search window data is stored in the operation section at a certain time. In FIG. 29, it is assumed that a displacement of a search window block at a rear of template block TB8 is (0, 0). Data shift units S#0 and S#1 store the pixel data of a search window block of a displacement vector (0, 48). Search window pixel data of 96 rows and 4 columns are stored in data buffer circuits 34#0 and 34#1. With respect to this search window block, template blocks TB1–TB 16 have different displacement vectors, respectively and the estimation values with respect to these template blocks TB1–TB16 are calculated.

Figure 30:
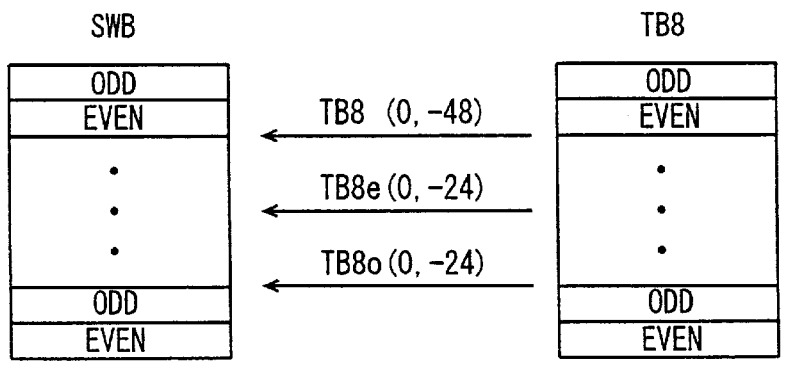
FIG. 30 shows displacement vectors for pixel data shown in FIG. 29.

The state shown in FIG. 29 corresponds to the frame displacement vector (0, −48) with respect to template block TB8 as shown in FIG. 30. For even sub-template block TB8e, field displacement vector (0, −24) is allotted with respect to the even field. For odd sub-template block TB8*o*, field displacement vector (0, −24) is allotted with respect to the odd field. The reason for the above vector allocation is as follows. Since the element processor is arranged corresponding to each pixel in the template block, element processors arranged corresponding to the pixels in the even field are supplied with search window block pixel data of the even field, and element processors arranged corresponding to the odd field pixels receive sub-search window block pixel data of the odd field.

The estimation calculation is executed on template blocks TB1–TB16 shown in FIG. 29 in the time division multiplexed manner by each of operation units E#0–E#3. Each of these template blocks TB1–TB16 corresponds to 16 pixels in the horizontal direction on the screen, and is shifted by 16 pixels from the adjacent block in the horizontal direction.

In this arithmetic operation, search window pixel data is applied from the shift unit to each element processor for a period of 4 clock cycles. In each clock cycle, each of operation units E#0–E#3 performs the calculation of the estimation values of four different template blocks.

When the estimation value calculating cycle for one search window block is completed, search window pixel data are transferred by one pixel while holding the template block pixel data in each element processor PE. More specifically, input section 2 applies search window pixel data by one pixel, and the shift units and the data buffer circuits 34#0 and 34#1 execute the data transfer by one pixel. Shift unit S#0 stores the same search window pixel data as shift unit S#1. Shift unit S#1 and data buffer circuits 34#0 and 34#1 are provided with a continuous data transfer path so that the data transfer by one pixel is simultaneously executed in shift units S#0 and S#1 as well as data buffer circuits 34#0 and 34#1.

Data buffer circuit 34#0 transfers the image data to corresponding shift register columns SRL0–SRL3. In the search window block shown in FIG. 29, therefore, the pixels in the uppermost row are transferred by the transfer operation into data buffer circuit 34#1, and conversely data of one pixel row is transferred from data buffer circuit 34#0 to shift units S#0 and S#1.

Figure 31:
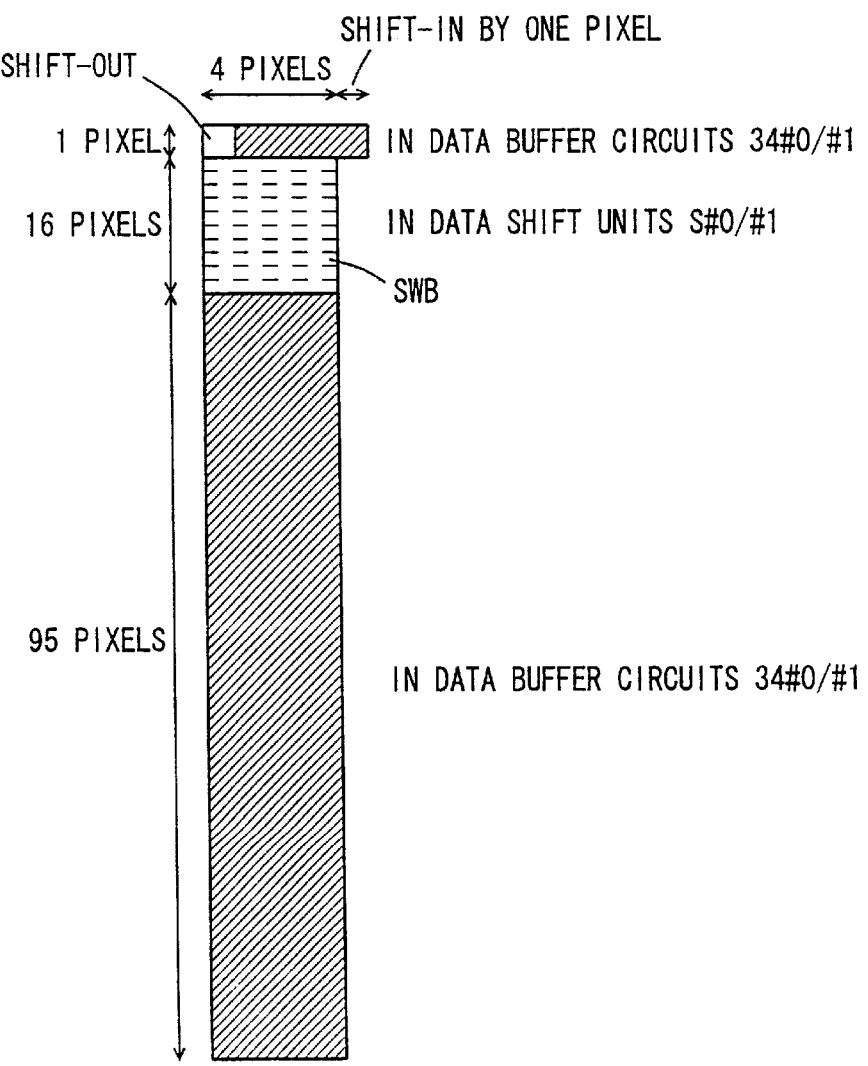
FIG. 31 shows a state of storage of search window pixel data in the operation section after elapsing of one estimation value calculating cycle.

FIG. 31 shows the state of the search window data stored when the above one pixel shifting is performed. The search window data held in the shift register SR00 at the final stage in the uppermost column (last column) SRL0 is shifted out, and one-pixel data is shifted into the data buffer circuit. Therefore, data buffer circuits 34#0 and 34#1 hold the search window pixel data of 96 pixels by 4 pixels. Shift units S#0 and S#1 store the pixel data of search window block SWB shifted vertically by one pixel. In this state, each of operation units E#0–E#3 calculates the estimation value.

Figure 32:
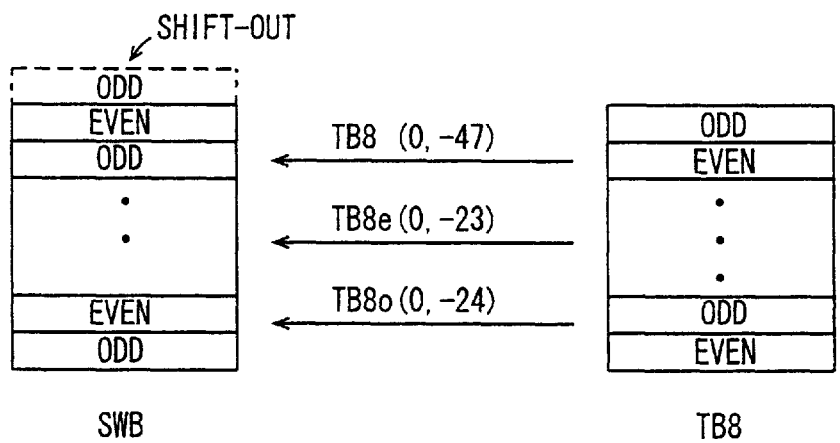
FIG. 32 shows displacement vectors of the stored data shown in FIG. 31.

FIG. 32 shows a displacement of template block TB8 in the state shown in FIG. 31. Search window block SWB is shifted by one pixel in the vertical direction. Therefore, data of the pixels in odd field ODD at the uppermost row are shifted out, and pixel data in odd field ODD is newly shifted in. Pixel data of template block TB8 is not transferred, and is resident therein. Therefore, a frame displacement vector of (0, −47) is allocated for template block TB8. Odd sub-template block TB8*e* is allocated with a field displacement vector (0, −23) with respect to the odd field. Even sub-template block TB8*o* corresponds to the pixel data in even field EVEN, and the pixel data in this even field EVEN has not changed. Therefore, even field EVEN has the same displacement vector as the even field in the last cycle, and odd sub-template block TB8*o* is allocated with a displacement (0, −24) with respect to the even field. On these displacement vectors, each element processor performs the operation for obtaining the absolute difference value, and the summing operation is performed on the absolute difference values supplied from the element processors so that the estimation value with respect to each displacement vector is calculated.

This operation of transferring the search window pixel data is repeated by the number of times corresponding to the displacements from −48 to +47 with respect to one horizontal displacement. In this state, the search window block at the lowermost position in the search window block is stored in shift units S#0 and S#1. In data buffer circuits 34#0 and 34#1, search window pixel data (96 pixels) for the next horizontal vector component is newly shifted in, and the pixel data which is required no longer is shifted out.

Figure 33:
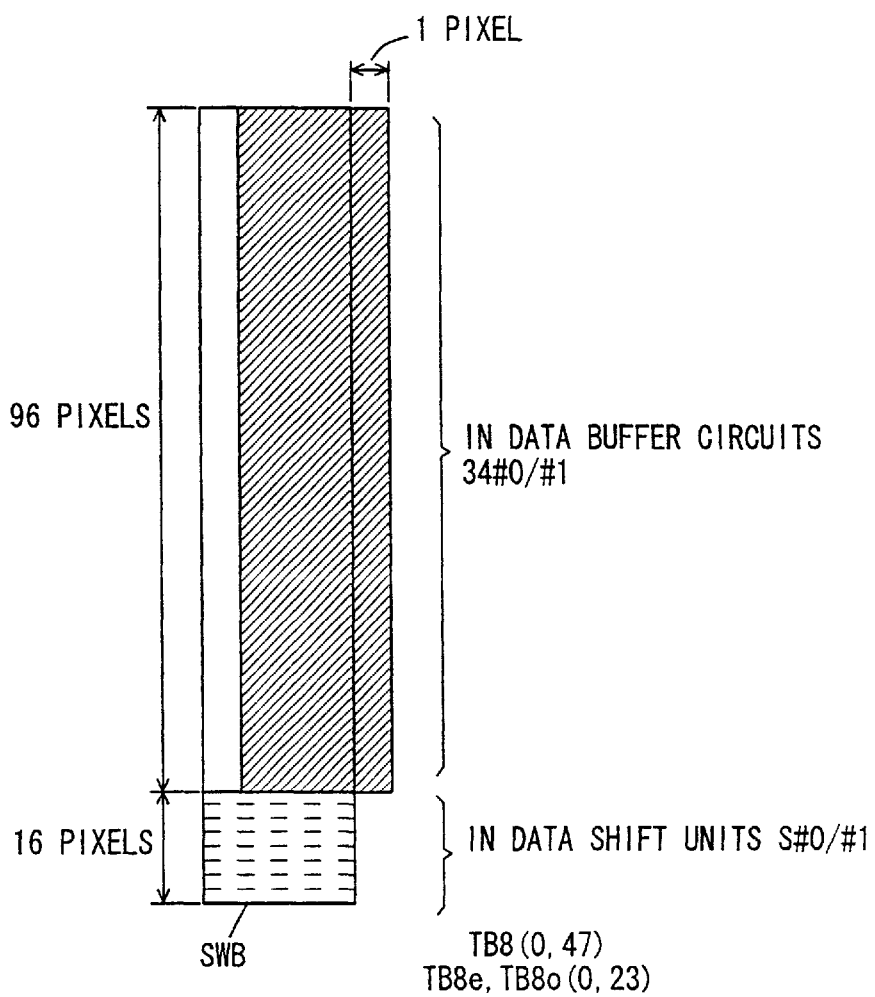
FIG. 33 shows a state of storage of the search window pixel data after completion of the estimation value calculation for one horizontal component.

In the state shown in FIG. 33, the frame displacement vector of (0, 47) is allocated to template block TB8, and even and odd sub-template blocks TB8*e* and TB8*o* are allocated with field displacement vectors of (0, +23) with respect to the even and odd fields, respectively. In this state, the calculation of the estimation value is executed, and vector searching operation for one horizontal displacement component is completed. When this searching operation is completed, the transfer of search window pixel data is performed for 16 cycles so as to input 16 search window pixel data into the data buffer circuit. In the transfer operation for 16 cycles, calculation of the estimation value is not executed.

Figure 34:
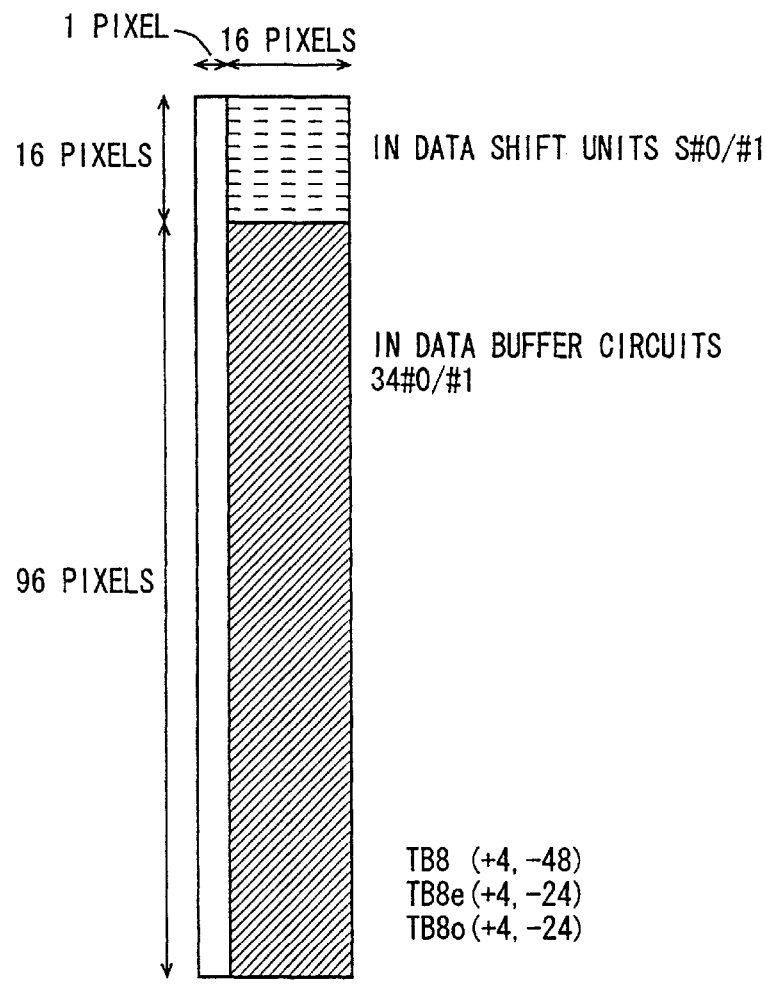
FIG. 34 shows a state of storage of the search window pixel data for the next horizontal component.

FIG. 34 schematically shows a state of storage of the search window pixel data after 16 pixels are shifted in. By the shift-in of 16 pixels, as shown in FIG. 34, search window pixel data corresponding to the next horizontal vector component (incremented by +4) are stored in the operation units. The shift registers of shift units S#0 and S#1 store the pixel data of the search window block of displacement vector (+4, −48) with respect to template block TB8. The remaining pixel data is stored in data buffer circuits 34#0 and 34#1. By repeating the same processing after the shift-in of the 16 pixel data, the motion vector can be searched in the search window having horizontal vector component incremented by +4. Thereafter, the above operation is executed for the displacement vectors in the search area.

Figure 35:
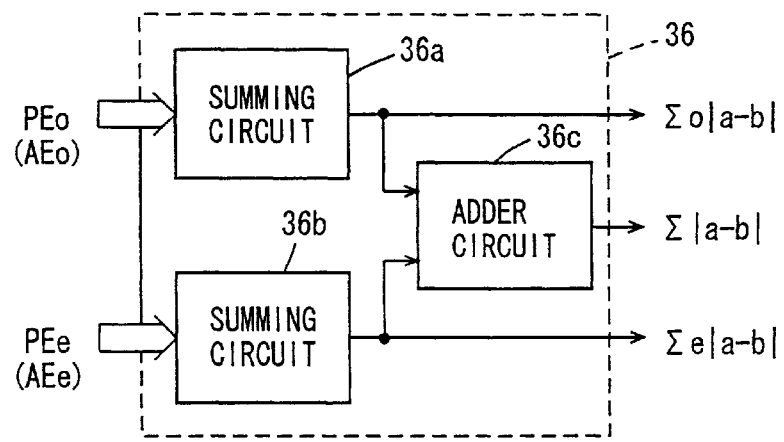
FIG. 35 schematically shows a structure of an adder circuit shown in FIG. 16.

FIG. 35 schematically shows a structure of adder circuit 36 shown in FIG. 17. As shown in FIG. 17, element processors PEij are arranged corresponding to the pixels in a template block, respectively. Accordingly, it is possible to determine from the positions of element processors whether each element processor is arranged corresponding to a pixel in even field EVEN or odd field ODD. Adder circuit 36 utilizes this feature for calculating the estimation values for the three prediction modes.

In FIG. 35, adder circuit 36 includes a summing circuit 36*a* for obtaining a total sum of output data (estimation value components) PEo (AEo) of element processors arranged corresponding to the pixels in the odd field, a summing circuit 36*b* for obtaining a total sum of output data (absolute difference values AEe) PEe of element processors arranged corresponding to the pixels in even field EVEN, and an adder circuit 36*c* obtaining a sum of the output values of summing circuits 36*a* and 36*b*. Summing circuit 36*a* generates a motion vector estimation value $\Sigma o|a-b|$ related to the odd sub-template block, and summing circuit 36*b* generates a motion vector estimation value $\Sigma e|a-b|$ related to the even sub-template block. Accordingly, the estimation values can be derived in parallel according to the three prediction modes, i.e., the modes of the frame prediction, even field prediction and odd field prediction.

Element processor PE stores pixel data of four template blocks. The estimation values of these four template blocks are calculated in a time division multiplexed manner. Therefore, motion vector estimation values for the four template blocks are calculated in four clock cycles. At every four clock cycles, pixel data of the search window is transferred.

According to the screen division shown in FIG. 26, the region including 16 template blocks TB1–TB16 aligned in the horizontal direction is assumed as the search area. It is not essential that the horizontal size of this search area is equal to the horizontal size of one screen. The screen may be divided into 32 portions aligned in the horizontal direction, and detection of the motion vector may be performed for the 16 template blocks.

When all the motion vector estimation values are calculated in the search area, comparing section 6 shown in FIG. 1 determines the displacement vector for the template block, which gives the minimum estimation value, as the motion vector for each of the prediction modes. Comparing section 6 merely includes a register and a comparator, and is configured to compare an applied estimation value and the estimation value stored in the register. Comparing section 6 is further configured to update the contents of the register upon each application of a smaller estimation value, to store the corresponding displacement vector value. The displacement vector of a motion vector candidate may be updated in accordance with a predetermined priority when the same estimation value components are applied.

For the 4-to-1 sub-sampling data, the pixels are sub-sampled at a rate of 4:1 in the horizontal direction, and the number of estimation values to be calculated does not change even if the horizontal vector components are increased by four times so that the motion vector search can be performed in a wider search area. Since the motion vector calculation is performed in parallel for a plurality of template blocks, the motion vector detection can be performed fast.

Operation at 2-to-1 Sub-Sampling Rate

Figure 36:
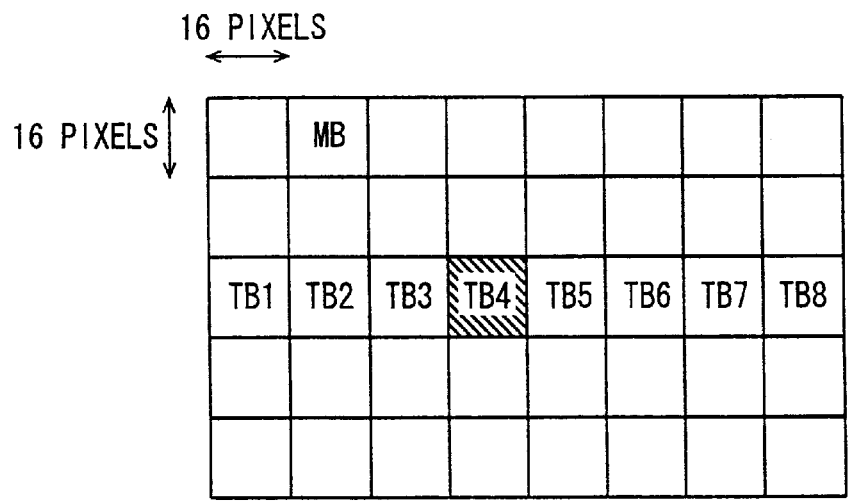
FIG. 36 schematically shows a structure of screen division in the 2-to-1 sub-sampling mode.

In the 2-to-1 sub-sampling mode, shift units S#0 and S#1 as well as data buffer circuits 34#0 and 34#1 are connected by select circuits 50 and 52 such that the pixel data is continuously transferred in one direction as shown in FIG. 25. More specifically, shift units S#0 and S#1 store the search window pixel data displaced by the delay times of delay buffers DBL0–DBL3. It is now assumed that one-frame image is divided into horizontally aligned eight macro blocks as shown in FIG. 36. This region is a search area for template block TB4. The macro block is formed of 16 pixels by 16 pixels.

Figure 37:
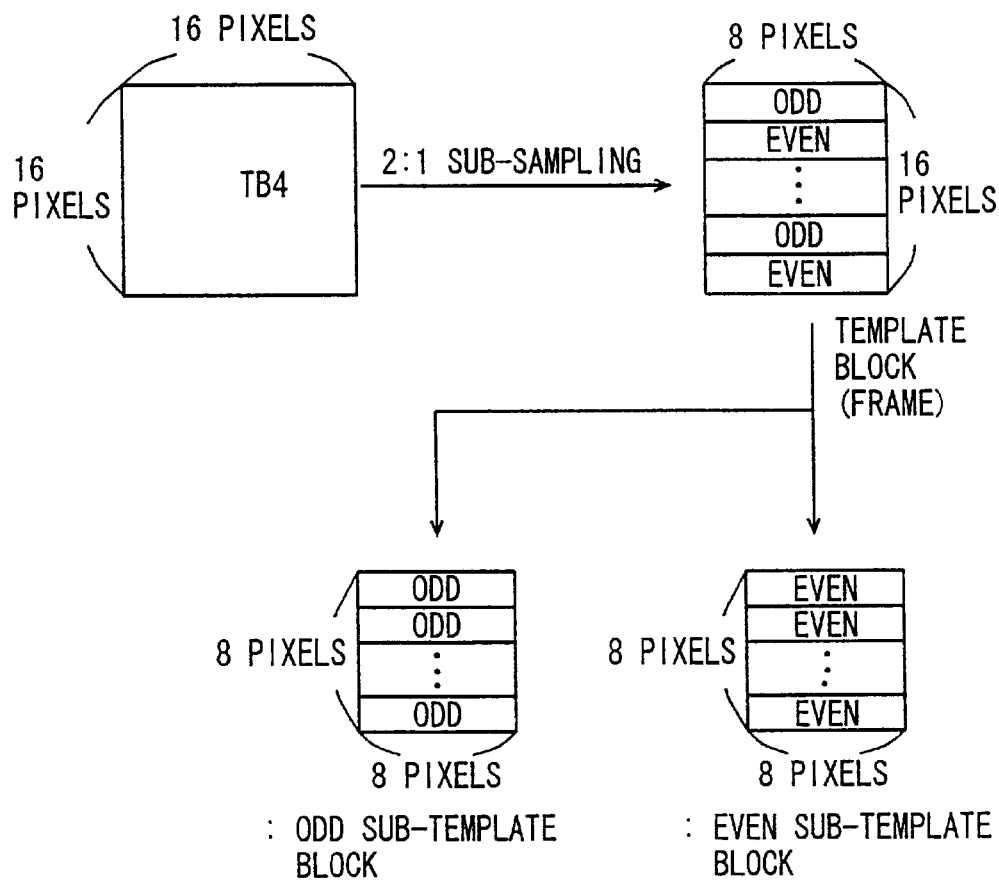
FIG. 37 schematically shows a structure of the template block in the 2-to-1 sub-sampling mode.

FIG. 37 schematically shows a structure of the template block processed by the operation section in the 2-to-1 sub-sampling mode. In the 2-to-1 sub-sampling mode, horizontally adjacent two pixels are sub-sampled into one pixel. Accordingly, template block TB4 of 16 pixels by 16 pixels is reduced into a frame template block of 16 pixel rows by 8 pixel columns. This frame template block includes a pixel data of even and odd fields EVEN and ODD. Accordingly, the odd sub-template block is formed of 8 pixel rows by 8 pixel columns, and the even sub-template block is likewise formed of 8 pixel rows and 8 pixel columns.

Description will now be given on the detection of the motion vector for template block TB4.

Figure 38:
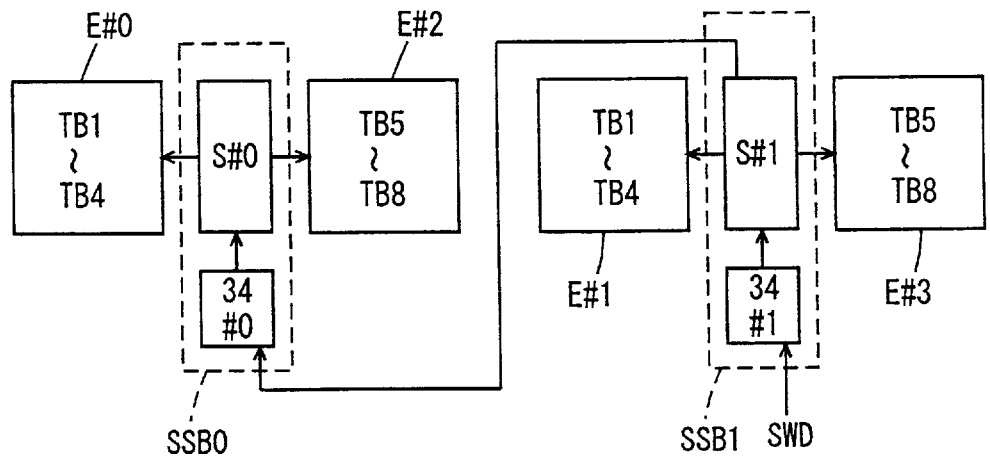
FIG. 38 schematically shows connection between the operation units in the 2-to-1 sub-sampling mode.

FIG. 38 schematically shows an arrangement of the operation section. In FIG. 38, shift unit S#0 and data buffer circuit 34#0 form sub-shift block SSB0 transferring 4 pixel columns. Shift unit S#1 and data buffer circuit 34#1 form a sub-shift block SSB1 transferring the search window pixel data of four columns. The pixel data shifted out from shift unit S#1 is applied to data buffer circuit 34#0. Operation unit E#0 stores the pixel data of left halves of respective template blocks TB1–TB4, and operation unit E#1 stores the pixel data of right halves of respective template blocks TB1–TB4. Operation unit E#2 stores the pixel data of left halves of respective template blocks TB5–TB8, and operation unit E#3 stores the pixel data of right halves of respective template blocks TB5–TB8. Each of data buffer circuits 34#0 and 34#1 stores pixel data of the search window including 48 pixels in the horizontal direction. In the 2-to-1 sub-sampling mode, the vertical search range is between −24 and +23. Therefore, shift units S#0 and S#1 store the search window pixel data in the same positions in the vertical direction.

Figure 39:
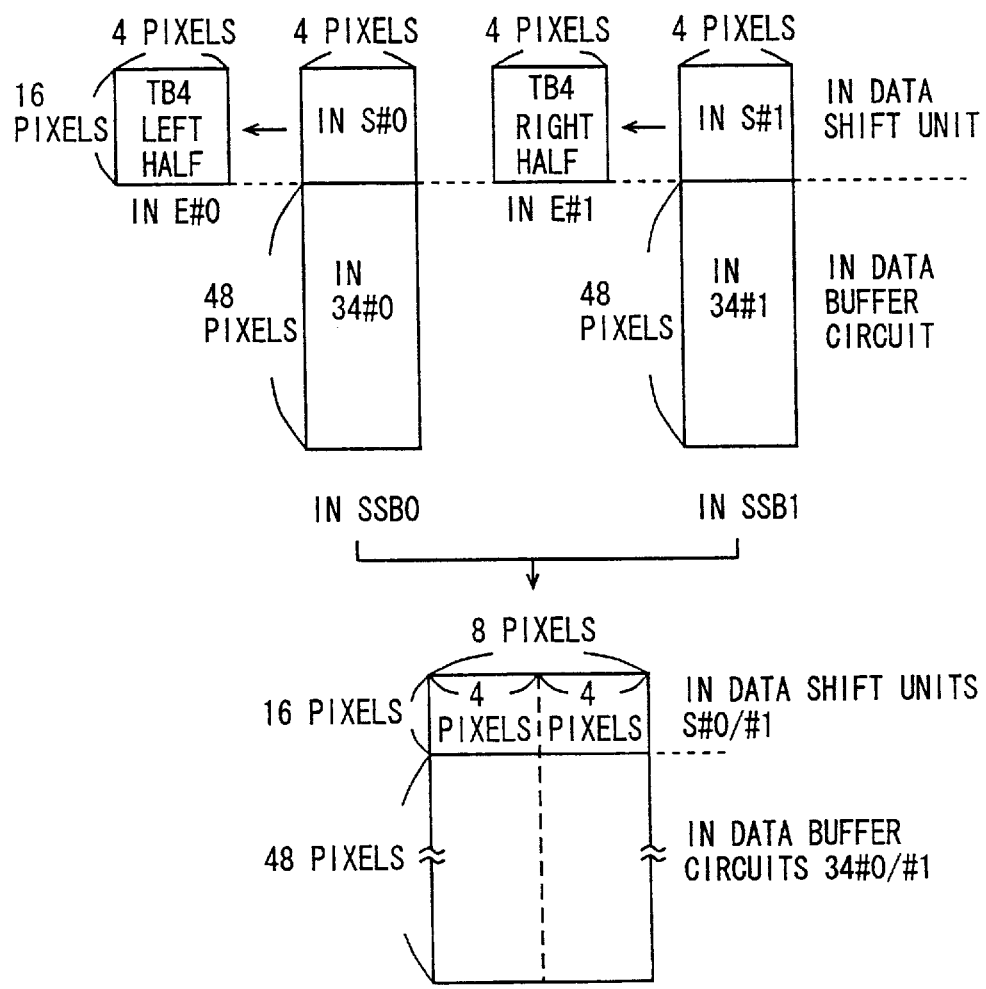
FIG. 39 schematically shows a state of storage of the pixel data in the 2-to-1 sub-sampling mode.

FIG. 39 shows the state where pixel data for template block TB4 is stored. Operation unit E#0 stores the pixel data of the left half of template block TB4 of 16 pixel rows by 4 pixel columns. Operation unit E#1 stores the pixel data of the right half of template block TB4 of 16 rows by 4 columns. Shift unit S#0 stores the search window pixel data of 16 pixel rows by 4 pixel columns, and data buffer circuit 34#0 stores the search window pixel data of 48 pixel rows by 4 pixel columns.

Shift unit S#1 stores the search window pixel data of 16 pixel rows by 4 pixel columns, and data buffer circuit 34#1 stores the search window pixel data of 48 pixel rows by 4 pixel columns. By combining the pixel data stored in sub-shift blocks SSB0 and SSB1, shift units S#0 and S#1 store search window block pixel data of 16 pixel rows by 8 pixel columns, and data buffer circuits 34#0 and 34#1 store search window block pixel data of 48 pixel rows by 8 pixel columns. Accordingly, operation unit E#0 produces the estimation value components for pixel data of the left half of template block TB4, and operation unit E#1 calculates the estimation value components for pixel data of the light half in template block TB4. By summing up these estimation value components, the estimation value of template block TB4 is produced.

As can be seen from FIG. 39, the shift operation of search window pixel data is performed such that data is shifted in pixel by pixel, as is done in the 4-to-1 sub-sampling mode, and the data is shifted pixel by pixel in sub-shift blocks SSB0 and SSB1.

In the state of storage of the search window pixel data in sub-shift blocks SSB0 and SSB1 shown in FIG. 39, the displacement vector of (0, −24) is allocated to frame template block TB4, and odd sub-template block TB4*o* is allocated with field displacement vector (0, −12) with respect to odd field ODD. Even sub-template block TB4*e* is allocated with field displacement vector (0, −12) with respect to even field EVEN. With respect to these displacement vectors, respective element processors PE*ij* obtain the absolute difference values between search window pixel data SW*ij* received from corresponding shift registers SR*ij* in the shift unit and stored template block pixel data. Resultant absolute difference values are summed up in summing section 36. More specifically, the total sum of the absolute difference values for odd sub-template block TB4*o* and the total sum of the absolute difference values for even sub-template block TB4*e* are obtained independently of each other. Thereafter, these total sums are added up to obtain the total sum of absolute difference values for template block TB4. The total sum of the absolute difference values generated from each of operation units E#0–E#3 is the sum of absolute difference values of a half of the pixel data of the template block. Therefore, another summing circuit is employed to add up the absolute difference values of the displacement vectors generated from the respective operation units, and the estimation values with respect to template block TB4 are produced according to the three prediction modes, i.e., the frame prediction, even field prediction and odd field prediction.

Element processor PEij stores pixel data of four template blocks. This is the same as that in the foregoing 4-to-1 sub-sampling mode. Therefore, search window pixel data is held in the shift register for a period of four clock cycles, and calculation of the estimation value components for each of the four template blocks is executed. Upon elapsing of the four clock cycles, search window pixel data are shifted by one pixel.

Figure 40:
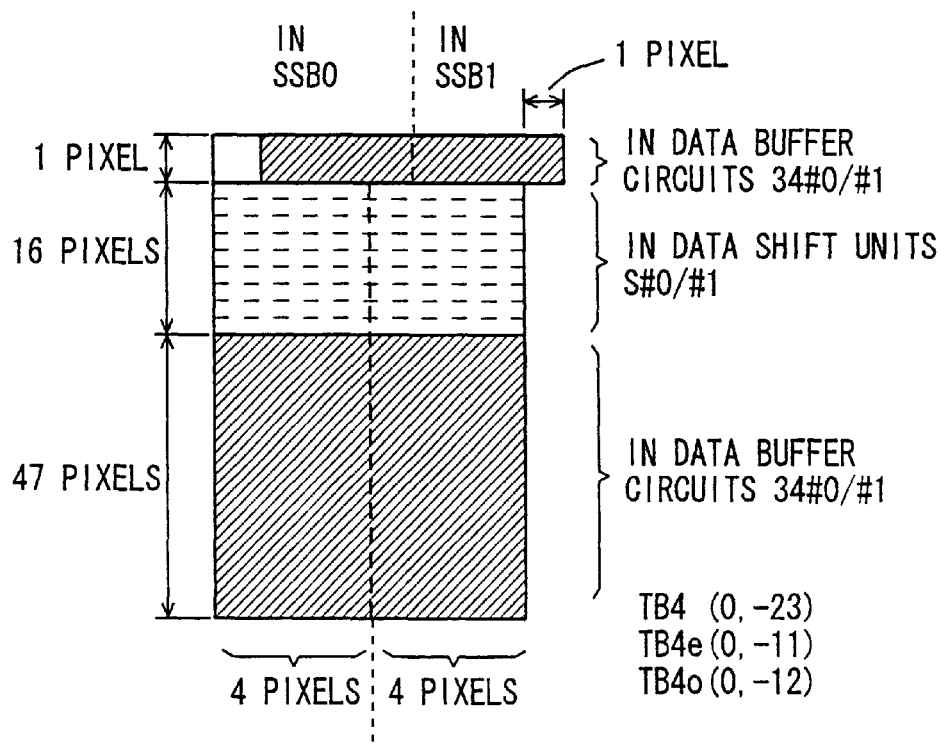
FIG. 40 shows a state of storage of the search window pixel data after elapsing of one estimation value calculating cycle.

FIG. 40 schematically shows a state in which the search window pixel data shifted by one pixel are stored in sub-shift blocks SSB0 and SSB1. In FIG. 40, search window data of one pixel is shifted into data buffer circuit 34#. Thereby, the shift operation by one pixel is performed in sub-shift blocks SSB1 and SSB0, and pixel data shifted out from shift unit S#1 is shifted into data buffer circuit 34#0. Also, data of one pixel is shifted out from shift unit S#0. Sub-shift block SSB0 stores four pixels in the uppermost row in the FIG. 40 as well as lower 47 by 4 pixels. Sub-shift block SSB0 also stores search window block pixel data of 16 pixels by 4 pixels. Sub-shift block SSB1 stores the search window pixel data of four pixels in the uppermost row in FIG. 40 as well as lower pixels of 47 by 4. Shift unit S#1 stores search window block pixel data of 16 pixels by 4 pixels.

This shown state corresponds to the state where shift units S#0 and S#1 store the search window blocks of the frame displacement vector (0, −23) for the template block of frame template block TB4, the field displacement vector (0, −12) with respect to even field EVEN for odd sub-template block TB4$o$, and the field displacement vector (0, −11) with respect to odd field for even sub-template block TB4$e$. The processing for obtaining the absolute difference values and the total sums thereof are performed on the search window block stored in shift units S#0 and S#1, similarly to the foregoing case. The estimation values are calculated according to the respective prediction modes, i.e., the modes of frame prediction, even field prediction and odd field prediction.

Figure 41:
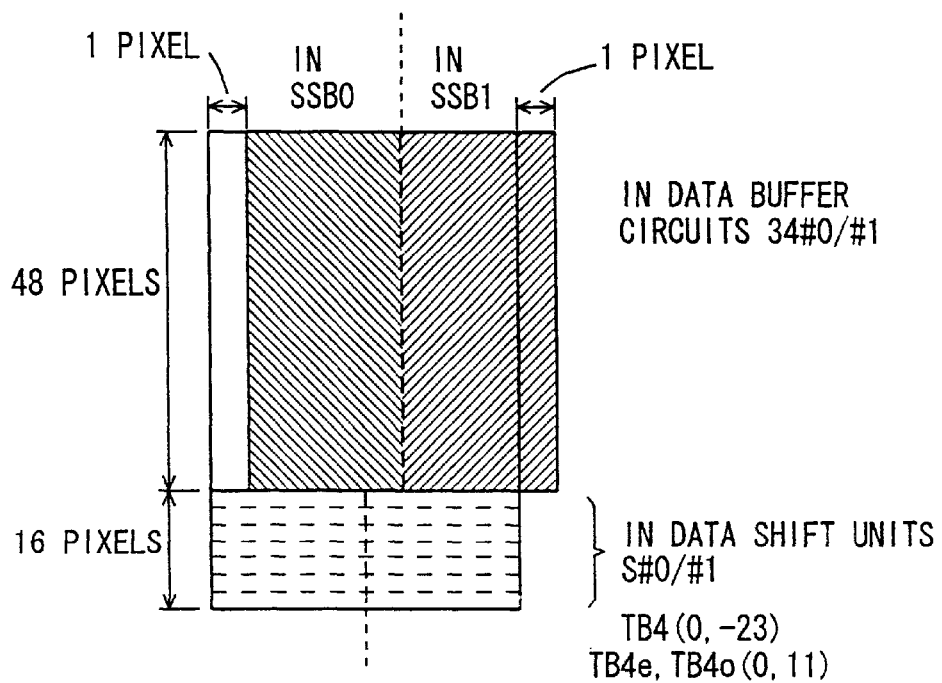
FIG. 41 shows a state of storage of the search window pixel data after completion of operation for one horizontal component.

The above operation of transferring search window pixel data is repeated by the number of times corresponding to the displacements (−48 between −24 and +23) with respect to one horizontal displacement. In this state, the search window block moves to the lowermost position as shown in FIG. 41. This state corresponds to the state storing the search window block of the frame displacement vector (0, 23) for template block T4, the field displacement vector (0, 11) with respect to the even field for even sub-template block TBe, and the field displacement vector (0, 11) with respect to the odd field for odd sub-template block TB4$o$. The data buffer circuit has already stored 48 search window pixel data. In this state, calculation of estimation values is performed. Data buffer circuits 34#0 and 34#1 store the search window pixel data stored in shift units S#0 and S#1 as well as the search window pixel data of pixels in the positions shifted horizontally by one sub-sampling pixel.

Figure 42:
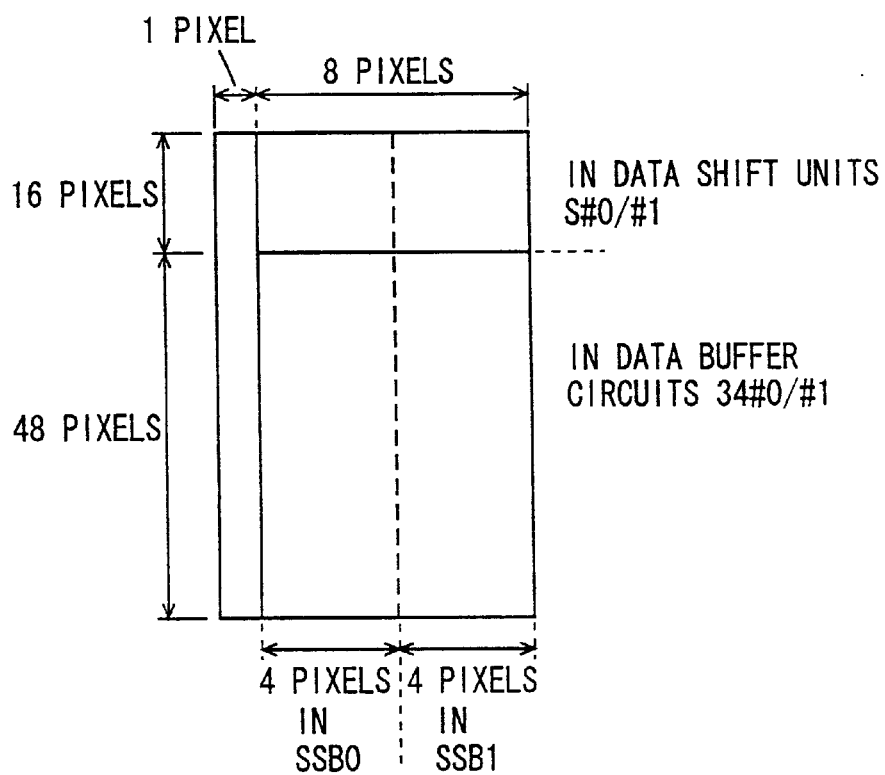
FIG. 42 shows a state of storage of the search window pixel data for the next horizontal component.

After completion of the above operations, the operation of merely transferring the search window pixel data without performing arithmetic operation is repeated 16 times (for 16 clock cycles). As a result, such a state is achieved that the estimation can be performed for an initial vertical displacement point with respect to the next horizontal displacement vector (+2 addition) as shown in FIG. 42.

The operation section stores the pixel data of the search window horizontally shifted by one sub-sampled pixel data. Here, one sub-sampled pixel corresponds to two pixels on the screen. Thereafter, the estimation value calculating operation is executed for all the vectors in the search area.

From resultant estimation values, comparing section 6 obtains the minimum estimation values according to the three prediction modes (frame prediction, even field prediction and odd field prediction) with respect to the respective template blocks. Displacement vectors for these minimum estimation values are determined as the motion vectors with respect to the template block, odd sub-template block and even sub-template block.

Figure 43:
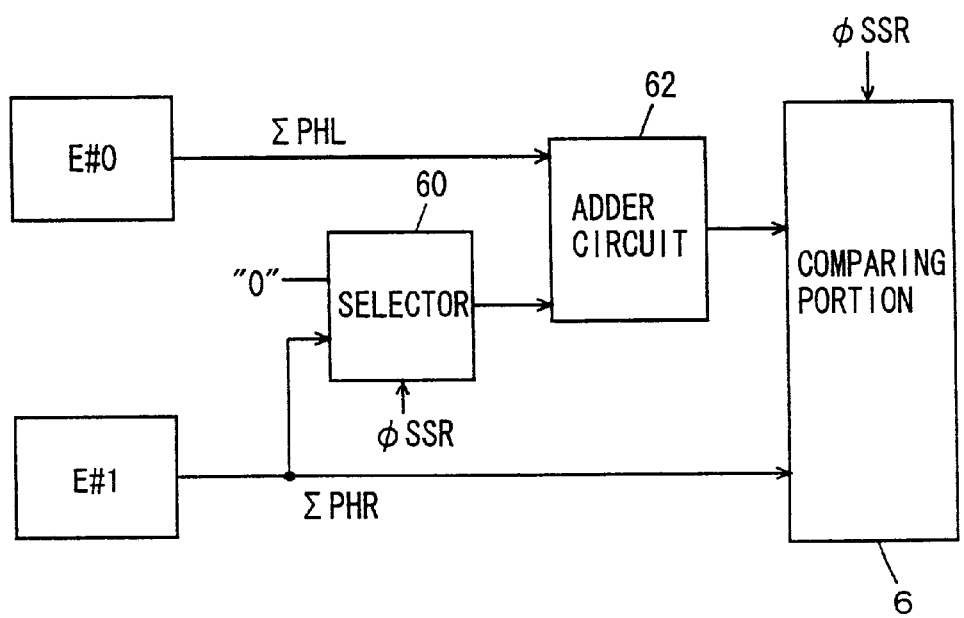
FIG. 43 schematically shows a structure of a front stage of a comparator in the operation section.

FIG. 43 schematically shows a structure of the adding unit. In FIG. 43, each of operation units E#0 and E#1 generates adder circuit 36. Therefore, each of operation units E#0 and E#1 generates the estimation value components related to half a template block. For these operation units E#0 and E#1, there are arranged a selector 60 which selects one of an estimation value component ΣPHR received from operation unit E#1 and a fixed value of 0 in accordance with sub-sampling rate instructing signal φSSR, and an adder circuit 62 which adds the output data of selector 60 to estimation value component ΣPHL received from operation unit E#0. The output data of adder circuit 62 is applied to comparing section 6. Comparing section 6 selectively validates and invalidates estimation value component data ΣPHR received from operation unit E#1 in accordance with sub-sampling rate instructing signal φSSR.

In the 4-to-1 sub-sampling mode, selector 60 selects the fixed value of 0. Therefore, adder circuit 62 generates estimation value component ΣPHL applied from operation unit E#0 to comparing section 6. In this 4-to-1 sub-sampling mode, comparing section 6 validates both the output data of adder circuit 62 and the output data of operation unit E#1 in accordance with sub-sampling mode instructing signal φSSR, and performs an optimum motion vector detecting operation (i.e., detects the displacement vector providing the minimum estimation value).

In the 2-to-1 sub-sampling mode, selector 60 selects estimation value component ΣPHR received from operation unit E#1. Therefore, adder circuit 62 obtains the sum of estimation value components ΣPHL and ΣPHR received from operation units E#0 and E#1, and applies the resultant sum to comparing section 6. In this 2-to-1 sub-sampling mode, comparing section 6 detects the minimum estimation value in accordance with output data of adder circuit 62. At this time, comparing section 6 ignores estimation value component ΣPHR applied from operation unit E#1.

The same structure as that of the addition unit shown in FIG. 43 is also provided for operation units E#2 and E#3. Estimation value components ΣPHL and ΣPHR generated from operation units E#0 and E#1 in FIG. 43 are representative examples of estimation components for the three prediction modes.

According to the first embodiment of the invention, as described above, the internal transfer path of the search window pixel data is changed in accordance with the sub-sampling rate. Therefore, the processing related to motion vector can be performed flexibly at different sub-sampling rates so that the vector search can be performed over a wide range without increasing the volume of hardware, and the image coding system of a high performance can be configured.

Second Embodiment

Figure 44:
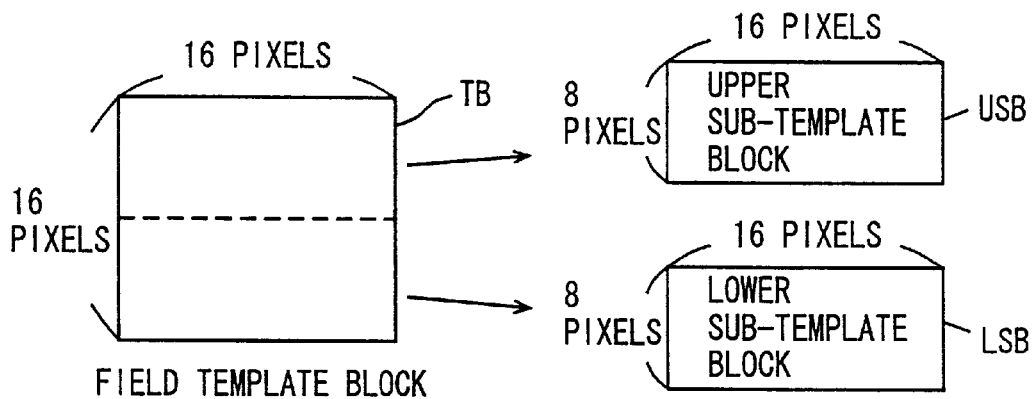
FIG. 44 schematically shows a structure of the template block of a second embodiment of the invention.

FIG. 44 schematically shows a structure of a template block of a second embodiment of the invention. In the second embodiment shown in FIG. 44, a field based image is input. A template block in this field image has a size of 16 pixels by 16 pixels. Field template block TB is divided into an upper sub-template block USB formed of 8 pixel rows by 16 pixel columns in the upper region and a lower sub-template block LSB formed of 8 pixel rows by 16 pixel columns in the lower half. Calculation of the estimation values is performed on each of field template block TB, upper sub-template block USB and lower sub-template block LSB.

Figure 45:
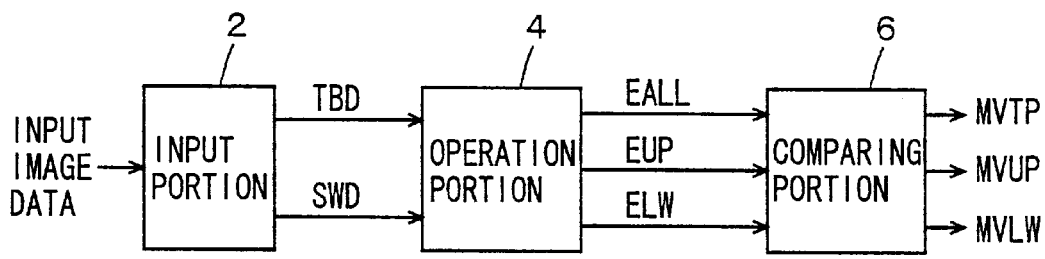
FIG. 45 schematically shows a whole structure of a motion vector detecting device according to the second embodiment of the invention.

FIG. 45 schematically shows a structure of a motion vector detecting device according to the second embodiment of the invention. In FIG. 45, the motion vector detecting device includes input section 2 which receives input image data and performs a sub-sampling at a predetermined sub-sampling rate to produce the sub-sampled template block data as well as sub-sampled search window pixel data TBD and SWD, operation section 4 which calculates the estimation values in accordance with pixel data TBD and SWD applied from input section 2, and comparing section 6 which detects motion vector MVTP with respect to the input template block, motion vector MVUP with respect to the upper sub-template block and motion vector MVLW with respect to the lower sub-template block in accordance with estimation values EALL, EUP and ELW received from operation section 4, respectively. Operation section 4 produces estimation value EALL with respect to the field template block, estimation value EUP with respect to the upper sub-template block and estimation value ELW with respect to the lower sub-template block.

The structure of motion vector detecting device shown in FIG. 45 is the same as the structure of the motion vector detecting device shown in FIG. 1. The motion vector detecting device in FIG. 45 differs from the device shown in FIG. 1 in that input image data is applied field by field. The internal structure is entirely the same as that in FIG. 1, and the estimation value calculating operation thereof is also the same as that of the device shown in FIG. 1. Accordingly, a field template block of 16 pixels by 16 pixels on the screen is sub-sampled into 16 pixel rows by 4 pixel columns in the 4-to-1 sub-sampling mode. Upper sub-template block USB is sub-sampled into 8 pixel rows by 4 pixel columns, and lower sub-template block LSB is sub-sampled into 8 pixel rows and 4 pixel columns. The size of each template block is the same as that in the first embodiment, and the shift circuitry included in the operation section are connected in the same manner. The only difference is distribution of the estimation value components generated from element processors PE to the adder circuit.

Figure 46:
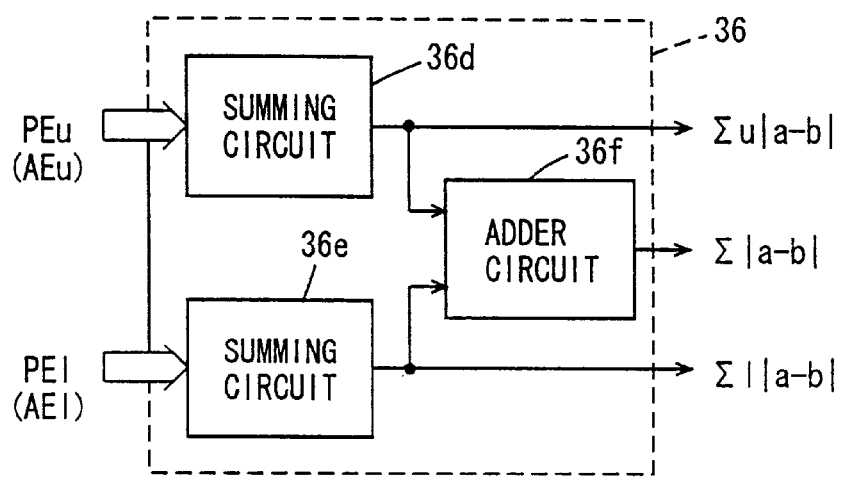
FIG. 46 schematically shows a distribution of estimation value components with respect to adder circuits included in the operation section.

FIG. 46 shows a structure of adder circuit 36 included in operation section 4 shown in FIG. 45. In FIG. 46, adder circuit 36 includes a summing circuit 36d which obtains a total sum of estimation value components PEu (absolute difference values AEu) received from element processors corresponding to the upper sub-template block among the element processors in a corresponding operation unit, a summing circuit 36e which obtains a total sum of estimation value components PEl (absolute difference values AEl) received from element processors arranged corresponding to the pixels in the lower sub-template block among the element processors in the corresponding operation unit, and an adder circuit 36f which obtains a sum of output values of summing circuits 36d and 36e. Summing circuit 36d generates an estimation value $\Sigma u|a-b|$ related to the upper sub-template block, and summing circuit 36e generates an estimation value $\Sigma|a-b|$ related to lower sub-template block LSB. Addition circuit 36f generates an estimation value $\Sigma|a-b|$ related to the field template block. According to these estimation values, comparing section 6 obtains the displacement vector providing a minimum estimation value. An additional circuit for the adding operation utilized in the 2-to-1 sub-sampling mode has the same structure as the structure shown in FIG. 43.

In operation of coding the pixel data field by field, the second embodiment can likewise operate to calculate the estimation values in parallel for the prediction modes in which the estimation values are obtained for the field template block, upper sub-template block and lower sub-template block, respectively. Different sub-sampling rates can be covered, as is done in the first embodiment, and therefore, the effect similar to that of the first embodiment can be achieved.

Third Embodiment

Figure 47:
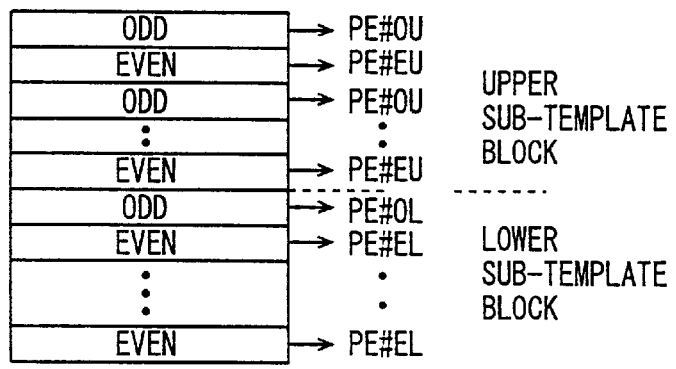
FIG. 47 schematically shows a structure of a template block and an arrangement of element processors in a third embodiment of the invention.

FIG. 47 schematically shows an arrangement of element processors in a third embodiment of the invention. In FIG. 47, element processors PE are divided into an element processor group PE#OU located in an upper half of a template block and corresponding to the pixels in an odd field, an element processor group PE#EU present at the sub-block in the upper half of the template block and arranged corresponding to the pixels in the even field, an element processor group PE#OL arranged corresponding to the pixels in the odd field of the lower half of the template block, and an element processor group PE#EL arranged corresponding to the pixels in the even field of the lower half of the template block. By dividing element processors into four groups, the motion vector detecting device can cover coding of the input image data on both a frame-by-frame basis and a field-by-field basis.

Figure 48:
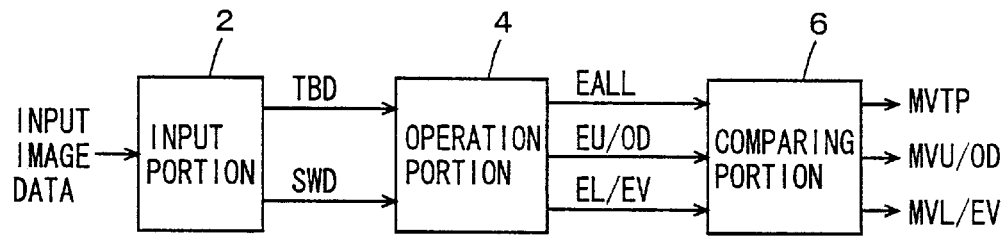
FIG. 48 schematically shows a whole structure of a motion vector detecting device according to the third embodiment of the invention.

FIG. 48 schematically shows a whole structure of the motion vector detecting device according to the third embodiment of the invention. Similarly to the first and second embodiments, the motion vector detecting device in FIG. 48 includes input section 2 which receives input image data and produces template block pixel data TBD and search window pixel data SWD, operation section 4 which produces estimation values EALL, EU/OD and EL/EV according to the three prediction modes, and comparing section 6 which produces motion vectors MVTP, MVU/OD and MVL/EV with respect to the three prediction modes in accordance with the estimation values received from operation section 4.

Estimation value EALL is obtained from calculation using all the pixels in a template block. Estimation value EU/OD is produced in accordance with the upper sub-template block prediction mode or the odd field prediction mode. The estimation value EL/EV is produced in accordance with the lower sub-template block prediction mode or the even field prediction mode. Motion vector MVTP represents the motion vector related to a template block. Motion vector MVU/OD represents the motion vector with respect to an upper sub-template block or an odd field. Motion vector MVL/EV is the motion vector related to a lower sub-template block or an even field.

According to the third embodiment, three prediction modes, i.e., the frame template block prediction mode, even field prediction mode and odd field prediction mode are used if the coding is performed frame by frame. If coding is performed field by field, the field prediction mode, upper sub-template block prediction mode and lower sub-template block prediction mode are used. Thus, it is possible to achieve the motion vector detecting device which can operate on both a frame-by-frame basis and a field-by-field basis.

Figure 49:
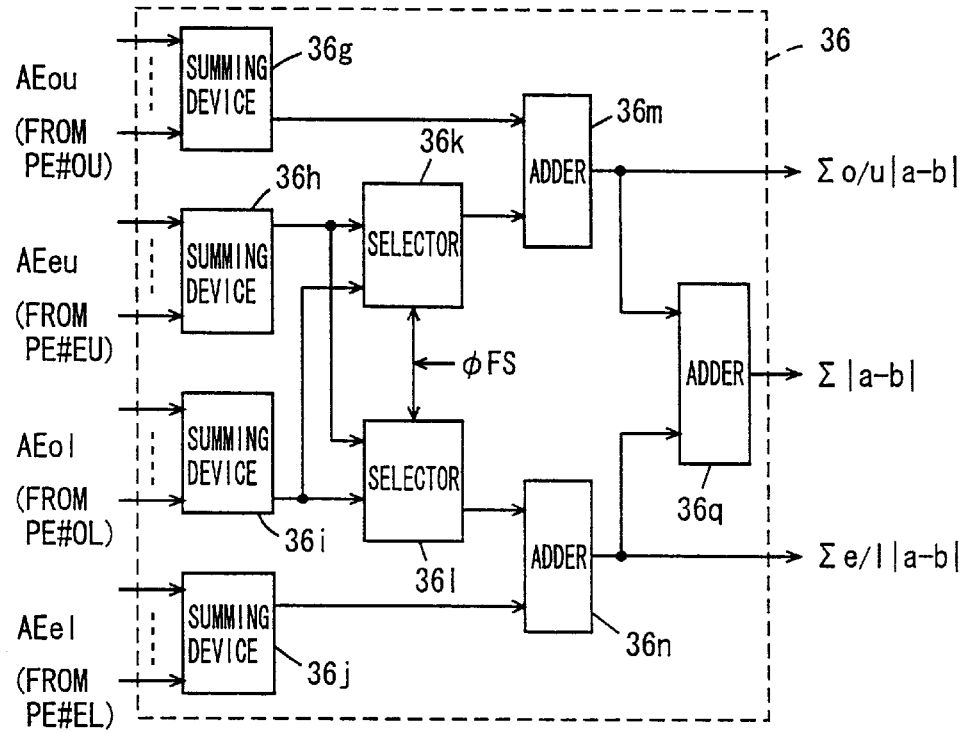
FIG. 49 schematically shows a structure of an adder circuit in the third embodiment of the invention.
Figure 50:
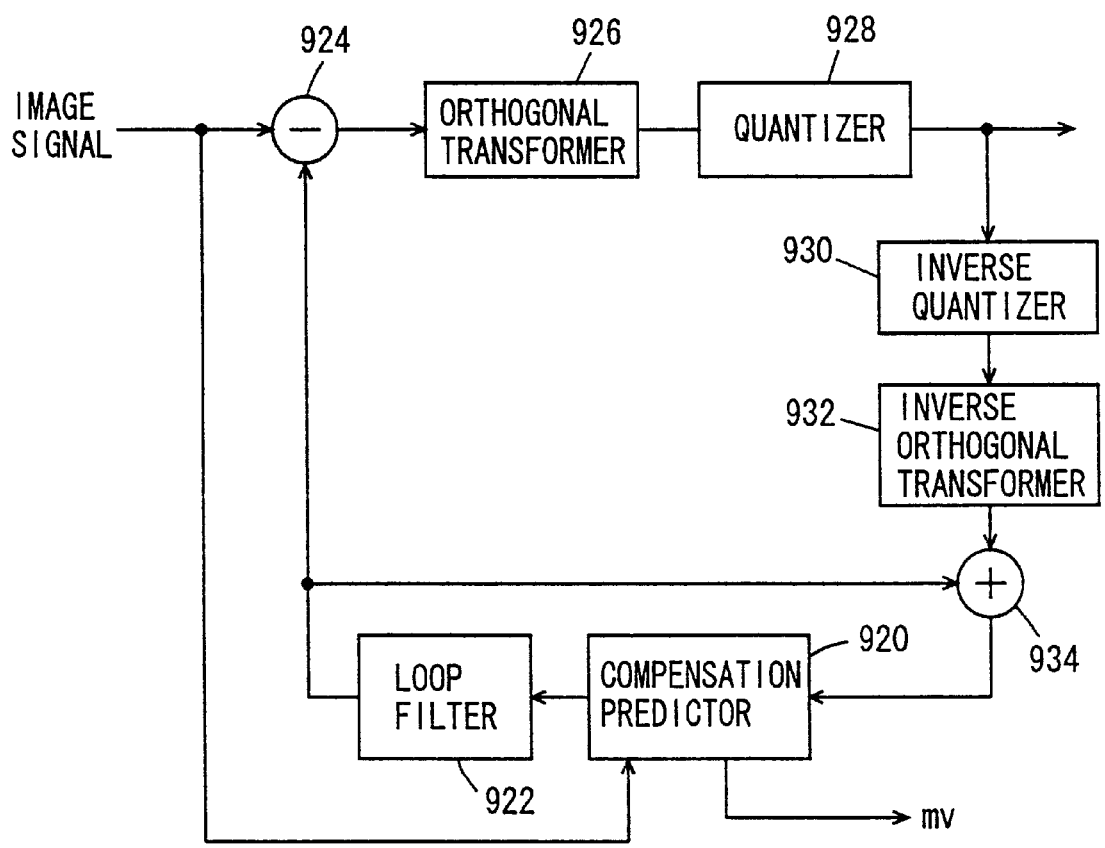
FIG. 50 schematically shows a structure of an image coding apparatus in the prior art.
Figure 51:
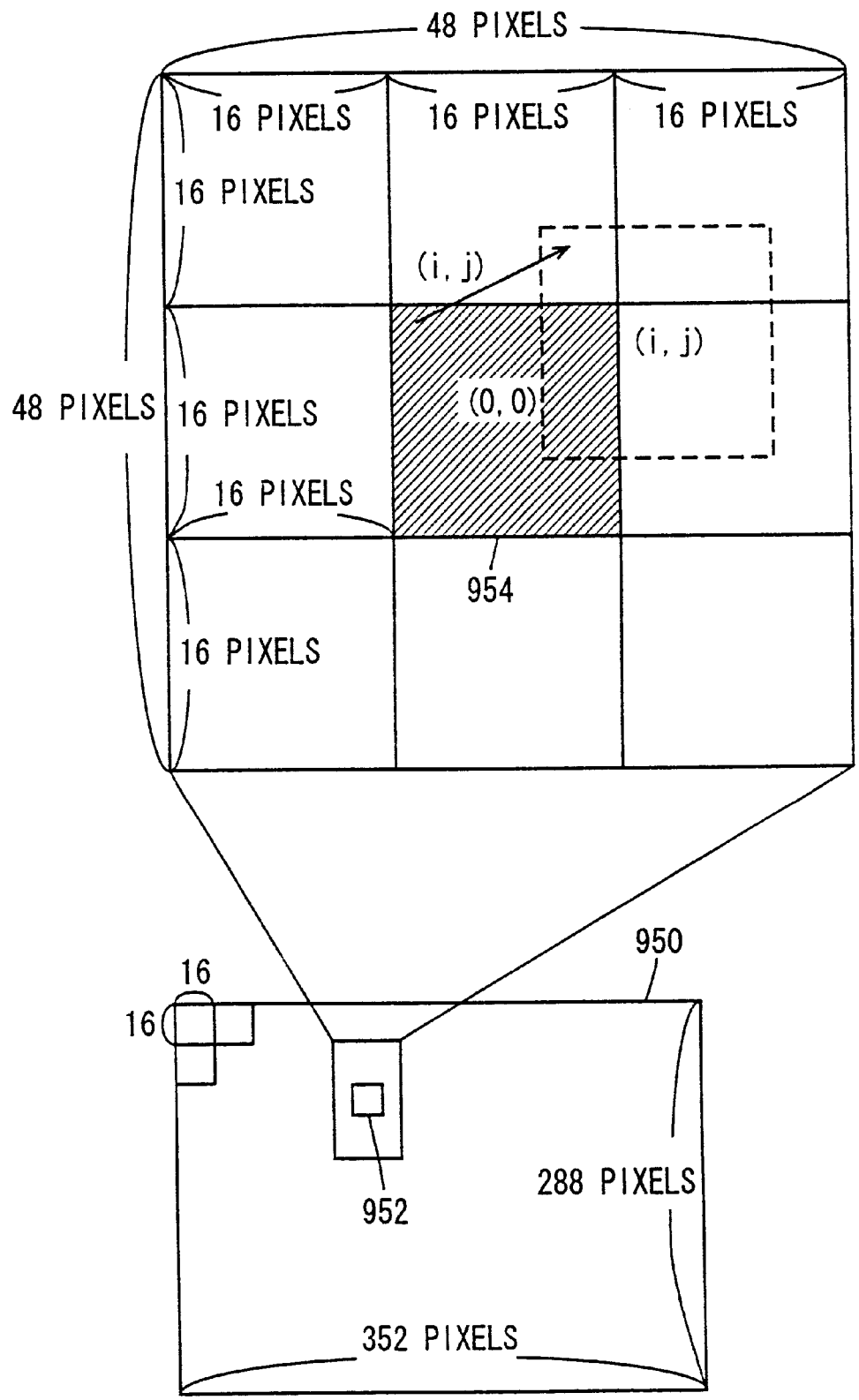
FIG. 51 shows motion vector detection.

FIG. 49 schematically shows a structure of adder circuit 36 in one operation unit included in operation section 4. The arrangement and structures of element processors PEij are the same as those of the first and second embodiments. In FIG. 49, adder circuit 36 includes a summing device 36g for obtaining a total sum of estimation value components AEou generated from an element processor group PE#OU arranged in the upper half block of a corresponding operation unit and provided corresponding to the pixels in the odd field, a summing device 36h for summing up estimation value components AEeu generated from element processor group PE#EU arranged corresponding to the pixels in the even field of the upper half block in the corresponding operation unit, a summing device 36i for summing up estimation values AEol generated from element processor group PE#OL arranged in the lower half block of the corresponding operation unit, and provided corresponding to the pixels in the odd field, a summing device 36j for summing up estimation values AEel received from element processor group PE#EL arranged corresponding to the pixels in the even field of the lower half block in the corresponding operation unit, a selector 36k for selecting output data of one of summing circuits 36h and 36i in accordance with a coding unit instructing signal IFS, a selector 36l for selecting one of output signals of summing circuits 36h and 36i in accordance with coding unit instructing signal φFS, an adder 36m for adding the output data of summing circuit 36g and the output data of selector 36k, an adder 36n for adding the output data of selector 36i and the output data of summing circuit 36j, and an adder 36q for adding output values of adders 36m and 36n.

The selector 36k selects the output data of summing circuit 36i when the coding is performed on a frame basis, and selects the output data of summing circuit 36h when the coding is performed on a field basis. Selector 36l performs the selecting operation in a manner complementary to that of selector 36l. Selector 36l selects the output data of summing circuit 36h when the coding is performed on a frame basis, and selects the output data of summing circuit 36i when the coding is performed on a field basis.

Adder 36m generates an estimation value Σo/u|a–b|, adder 36n generates an estimation value Σe/l|a–b|, and adder 36q generates an estimation value Σ|a–b|.

When the coding is performed on a frame basis, selector 36k selects the output data of summing circuit 36i, and selector 36l selects the output data of summing circuit 36h. Therefore, adder 36m generates estimation value Σo|a–b| related to the odd field, and adder 36n generates estimation value Σe|a–b| related to the even field. Adder 36q generates the estimation value related to the template block.

When the coding is performed on a field basis, selector 36k selects the output data of summing circuit 36h, and selector 36l selects the output data of summing circuit 36i. Therefore, adder 36m generates estimation value Σu|a–b| related to the upper sub-template block, and adder 36n issues estimation value Σl|a–b| related to the lower sub-template block.

The estimation value output from adder circuit 36 provided in each operation unit is applied to selector 60 and adder circuit 62 shown in FIG. 43.

By utilizing the adder circuit shown in FIG. 49, the transmission paths of output data of the respective element processors are divided by interconnection lines in accordance with positions of the element processors, and a total sum is obtained in each of the four regions. Further, combinations of the total sums are switched in accordance with the base of coding. Thereby, the motion detecting device can easily cover the three prediction modes, i.e., the frame prediction mode, even field prediction mode and odd field prediction mode as well as for the other three modes, i.e., the field prediction mode, upper sub-template block prediction mode and lower sub-template block prediction mode.

According to the third embodiment of the invention, as described above, the element processors are divided into four groups in accordance with the positions thereof, and the combination of the element processors to be summed is changed in accordance with the base of coding. Therefore, the motion vector detecting device covering the coding on a frame-by-frame basis and the coding on a field-by-field basis, can be easily achieved. Further, the effect similar to those of the first and second embodiments can be achieved.

Other Modifications

In the foregoing description, the delay buffers store pixel data of 48 words. However, the number of delay stages of the delay buffers may be changed in accordance with a vertical search area size. The number of operation units is not restricted to 4. The number of element processor columns included in one operation unit may be reduced in accordance with the maximum sub-sampling rate, and correspondingly the number of operation units may be increased.

The number of pixel data stored in the delay buffers is merely required to be equal to (M–16), where M is the number of pixels of a search window in the vertical direction and 16 is the number of pixels in the vertical direction of a template block. The search area size in the vertical direction in the 2-to-1 sub-sampling rate as well as the search area size in the vertical direction in the 4-to-1 sub-sampling can be set to arbitrary values by employing the delay buffers formed of variable delay buffers.

According to the invention, as described above, the motion vector can be detected at a plurality of sub-sampling rates without increasing the volume of hardware, and motion vectors can be detected with high accuracy in a wide search area.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A motion vector detecting device comprising:

image data input circuitry for receiving template block pixel data and search area pixel data, and sub-sampling both of the template block pixel data and the search area pixel data at a sub-sampling rate, said image data input circuitry allowing the sampling rate of the template block pixel data and the search area pixel data to be changed;

operation circuitry for receiving subsampled template block pixel data and subsampled search area pixel data from said image data input circuitry, and calculating an estimation value representing a candidate of a motion vector according to a block matching method with respect to the template block; and motion vector determining circuitry for receiving the estimation value from said operation circuitry, and determining the motion vector with respect to said template block in accordance with the received estimation value, said operation circuitry including;
- a shift register circuit including shift registers for transferring pixel data in one direction, said shift registers successively transferring and storing the search area pixel data applied from said image data input circuitry,
- a plurality of element processors provided corresponding to the shift registers of said shift register circuit, each of said plurality of element processors including a data register for storing the template block pixel data applied from said image data input circuitry, and a calculating circuit receiving pixel data stored in said data register and storage data in a corresponding shift register, for performing a predetermined operation on received data to produce and output a component of said estimation value, said plurality of element processors storing data of different pixels of said template block, and
- a path setting circuit for changing a data transfer path of said shift register circuit in accordance with information on the sub-sampling rate.

2. The motion vector detecting device according to claim 1, wherein
said operation circuitry includes a plurality of operation units each including a plurality of the element processors arranged in rows and columns;
said shift register circuit includes a plurality of delay buffer circuits arranged corresponding to the columns of said element processors, and said shift registers are arranged in rows and columns corresponding to the rows and columns of said element processors; and
said path setting circuit includes means for changing a connection path between said plurality of buffer circuits and the shift register columns to change the transfer path of the search area pixel data in said shift register circuit.

3. The motion vector detecting device according to claim 1, wherein
said operation circuitry includes a plurality of operation units each including a plurality of the element processors arranged in rows and columns;
said shift register circuit includes a plurality of shift units each provided commonly to a predetermined number of the operation units, and each of said plurality of shift units has the shift registers arranged in rows and columns corresponding to the element processors of a corresponding operation unit;
said shift register circuit further includes a plurality of buffer circuits provided corresponding to the shift units, each buffer circuit including a plurality of delay buffers arranged corresponding to the shift register columns of a corresponding shift unit, and
said path setting circuit includes means for setting connection between said plurality of buffer circuits and connection between said plurality of buffer circuits and corresponding shift units in accordance with the sub-sampling rate information, and said shift register circuit stores pixel data by a pixel number according to the sub-sampling rate of said search area pixel data, and transfers the search area pixel data in one direction via the delay buffers and the shift registers.

4. The motion vector detecting device according to claim 1, wherein
the data register of the element processor includes a plurality of data register circuits storing pixel data at same positions in different template blocks, respectively; and
said calculating circuit includes means for effecting the predetermined processing on pixel data stored in said plurality of data register circuits and the received search area pixel data from a corresponding shift register in a time division multiplexed manner.

5. The motion vector detecting device according to claim 1, wherein
said operation circuitry includes first to fourth operation units each including the element processors arranged in p rows and q columns;
said shift register circuit includes;
- a first shift unit including a plurality of the shift registers shared by the first and second operation units and arranged in said p rows and said q columns for transferring received pixel data in one direction,
- a second shift unit including a plurality of the shift registers shared by the third and fourth operation units and arranged in said p rows and said q columns for transferring received pixel data in one direction,
- a first data buffer circuit including a plurality of the delay buffers arranged corresponding to the shift register columns of said first shift unit, for delaying applied pixel data by a predetermined time to generate delayed pixel data in parallel, and
- a second data buffer circuit including a plurality of the delay buffers arranged corresponding to the shift register columns of said second shift unit for delaying received pixel data to generate delayed pixel data in parallel; and
said path setting circuit includes;
- a first select circuit arranged between said second shift unit and the first and second data buffer circuits for selectively applying pixel data received from said first and second data buffer circuits to said second shift unit in accordance with said sub-sampling rate information, and
- a second select circuit for applying one of a set of parallel pixel data received from said second data buffer circuit and a set of output pixel data outputted from shift register at a final stage in first through (q−1)th shift register columns of said first shift unit and the shift register at a final stage in a q-th column of said second shift unit to said first data buffer circuit in accordance with said sub-sampling rate information;
output pixel data of said first data buffer circuit is also applied to said first shift, unit, and the delay buffers of said second data buffer circuit each receive output pixel data from shift register at a final stage in a shift register column preceding by one column a corresponding column in said second shift unit, and delay buffer in a first column in said second shift circuit receives the search area pixel data from said pixel data input circuitry.

6. The motion vector detecting device according to claim 1, wherein
said image data input circuitry includes a horizontal filter of a factor of $2^n$ receiving said template block pixel data and said search area pixel data, and said factor of $2^n$ corresponds to said sub-sampling rate.

7. The motion vector detecting device according to claim 6, wherein said horizontal filter includes a circuit for performing a predetermined filtering processing with said factor when activated and for selecting and outputting one of $2^n$ pixel data when inactivated.

8. The motion vector detecting device according to claim 1, wherein said image data input circuitry includes a sub-sampling circuit for sub-sampling input pixel data, and a circuit performing a predetermined arithmetic operation on output data of said sub-sampling circuit to reduce an accuracy of said output data.

9. The motion vector detecting device according to claim 1, wherein said image data input circuitry further includes a buffer memory for storing the sub-sampled pixel data, and pixel data read from said buffer memory is applied to said operation circuitry.

10. The motion vector detecting device according to claim 1, wherein said operation circuitry includes a circuit for receiving in parallel the estimation value components from said plurality of element processors, and producing in parallel estimation values according to a plurality of prediction modes.

11. The motion vector detecting device according to claim 1, wherein said plurality of element processors is equal in number to pixels on a screen of the template block.

12. The motion vector detecting device according to claim 6, wherein with horizontal filter includes a circuit for obtaining an average of the $2^n$ pixel data for outputting.

* * * * *